United States Patent
Wu et al.

(10) Patent No.: US 11,689,936 B2
(45) Date of Patent: Jun. 27, 2023

(54) SYNCHRONIZATION SIGNAL BLOCK BEAM SWITCHING

(71) Applicant: QUALCOMM Incorporated, San Diego, CA (US)

(72) Inventors: Yongle Wu, San Diego, CA (US); Raghu Narayan Challa, San Diego, CA (US); Yong Li, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/303,249

(22) Filed: May 25, 2021

(65) Prior Publication Data

US 2022/0386139 A1 Dec. 1, 2022

(51) Int. Cl.
| | |
|---|---|
| *H04W 56/00* | (2009.01) |
| *H04W 16/28* | (2009.01) |
| *H04W 4/021* | (2018.01) |
| *H04W 8/24* | (2009.01) |
| *H04W 24/10* | (2009.01) |
| *H04W 80/02* | (2009.01) |

(52) U.S. Cl.
CPC ......... *H04W 16/28* (2013.01); *H04W 4/021* (2013.01); *H04W 8/245* (2013.01); *H04W 24/10* (2013.01); *H04W 56/001* (2013.01); *H04W 80/02* (2013.01)

(58) Field of Classification Search
CPC ..... H04W 16/28; H04W 8/245; H04W 24/10; H04W 56/001
See application file for complete search history.

(56) References Cited

U.S. PATENT DOCUMENTS

| | | | | |
|---|---|---|---|---|
| 2017/0249546 A1* | 8/2017 | Weisgerber | ......... | H04B 7/0408 |
| 2020/0229161 A1* | 7/2020 | Raghavan | ............. | H04W 72/23 |
| 2020/0350972 A1* | 11/2020 | Yi | ......... | H04L 5/0053 |
| 2020/0351842 A1* | 11/2020 | Lin | ....... | H04W 72/23 |
| 2021/0058131 A1* | 2/2021 | Zhu | ...... | H04B 7/063 |
| 2021/0068123 A1* | 3/2021 | Zhu | ...... | H04W 72/542 |
| 2021/0329515 A1* | 10/2021 | Sharma | ................ | H04W 36/08 |
| 2022/0124799 A1* | 4/2022 | Hu | ........ | H04W 24/08 |
| 2022/0232546 A1* | 7/2022 | Hakola | ................ | H04L 5/0048 |
| 2022/0287013 A1* | 9/2022 | Farag | ................. | H04L 5/0051 |

(Continued)

OTHER PUBLICATIONS

Ericsson: "Section 7.1: UE Transmit Timing Requirements under Beam Switch", 3GPP TSG-RAN4 Meeting #90bis, R4-1904345, UE TX Timing Beam Switch 38.133, 3rd Generation Partnership Project, Mobile Competence Centre, 650, Route Des Lucioles, F-06921 Sophia-Antipolis Cedex, France, vol. RAN WG4, No. Xian, China, Apr. 8, 2019-Apr. 12, 2019, Apr. 1, 2019, XP051714685, 9 Pages, Section 7.1.2.

(Continued)

*Primary Examiner* — Fahmida S Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may identify a base station capable of performing medium access control (MAC) based transmission configuration indication (TCI) switching. The UE may deactivate an autonomous beam switching mode based at least in part on the base station being capable of performing MAC based TCI switching. Numerous other aspects are described.

30 Claims, 18 Drawing Sheets

(56) References Cited

U.S. PATENT DOCUMENTS

2022/0294509 A1\* 9/2022 Xu .................... H04B 7/0695
2022/0294518 A1\* 9/2022 Hsieh ................ H04B 7/18504

OTHER PUBLICATIONS

Huawei., et al., "Discussion on FR2 Inter-Band DL CA Enhancement", 3GPP TSG-RAN WG4 Meeting #99-e, R4-2110301, 3rd Generation Partnership Project, Mobile Competence Centre, 650, Route Des Lucioles, F-06921 Sophia-Antipolis Cedex, France, vol. RAN WG4, No. Electronic Meeting, May 19, 2021-May 27, 2021, May 11, 2021, XP052008876, pp. 1-5, p. 2-3.
International Search Report and Written Opinion—PCT/US2022/072500—ISA/EPO—dated Nov. 4, 2022.
OPPO: "Discussion on Further Enhancements for Multi-Beam Operation", 3GPP TSG RAN WG1 #104b-e, R1-2102479, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021 XP052177185, 3 Pages, the whole document.
Partial International Search Report—PCT/US2022/072500—ISA/EPO—dated Sep. 13, 2022.

\* cited by examiner

SYNCHRONIZATION SIGNAL BLOCK BEAM SWITCHING

FIELD OF THE DISCLOSURE

Aspects of the present disclosure generally relate to wireless communication and to techniques and apparatuses for synchronization signal block (SSB) beam switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors, coupled to the memory, configured to identify a base station capable of performing medium access control (MAC) based transmission configuration indication (TCI) switching; and deactivate an autonomous beam switching mode based at least in part on the base station being capable of performing MAC based TCI switching.

In some aspects, a UE for wireless communication includes a memory; and one or more processors, coupled to the memory, configured to: identify a modified parameter based at least in part on a condition; select a synchronization signal block in accordance with the modified parameter; and switch to the selected synchronization signal block in accordance with the modified parameter.

In some aspects, a method of wireless communication performed by a user equipment includes identifying a base station capable of performing medium access control based transmission configuration indication switching; and deactivating an autonomous beam switching mode based at least in part on the base station being capable of performing MAC based TCI switching.

In some aspects, a method of wireless communication performed by a user equipment includes identifying a modified parameter based at least in part on a condition; selecting a synchronization signal block in accordance with the modified parameter; and switching to the selected synchronization signal block in accordance with the modified parameter.

In some aspects, a non-transitory computer-readable medium storing a set of instructions for wireless communication includes one or more instructions that, when executed by one or more processors of a UE, cause the UE to identify a base station capable of performing MAC based TCI switching; and deactivate an autonomous beam switching mode based at least in part on the base station being capable of performing MAC based TCI switching.

In some aspects, a non-transitory computer-readable medium storing a set of instructions for wireless communication includes one or more instructions that, when executed by one or more processors of a UE, cause the UE to identify a modified parameter based at least in part on a condition; select a synchronization signal block in accordance with the modified parameter; and switch to the selected synchronization signal block in accordance with the modified parameter.

In some aspects, an apparatus for wireless communication includes means for identifying a base station capable of performing MAC based TCI switching; and deactivating an autonomous beam switching mode based at least in part on the base station being capable of performing MAC based TCI switching.

In some aspects, an apparatus for wireless communication includes means for identifying a modified parameter based at least in part on a condition; selecting a synchronization signal block in accordance with the modified parameter; and switching to the selected synchronization signal block in accordance with the modified parameter.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
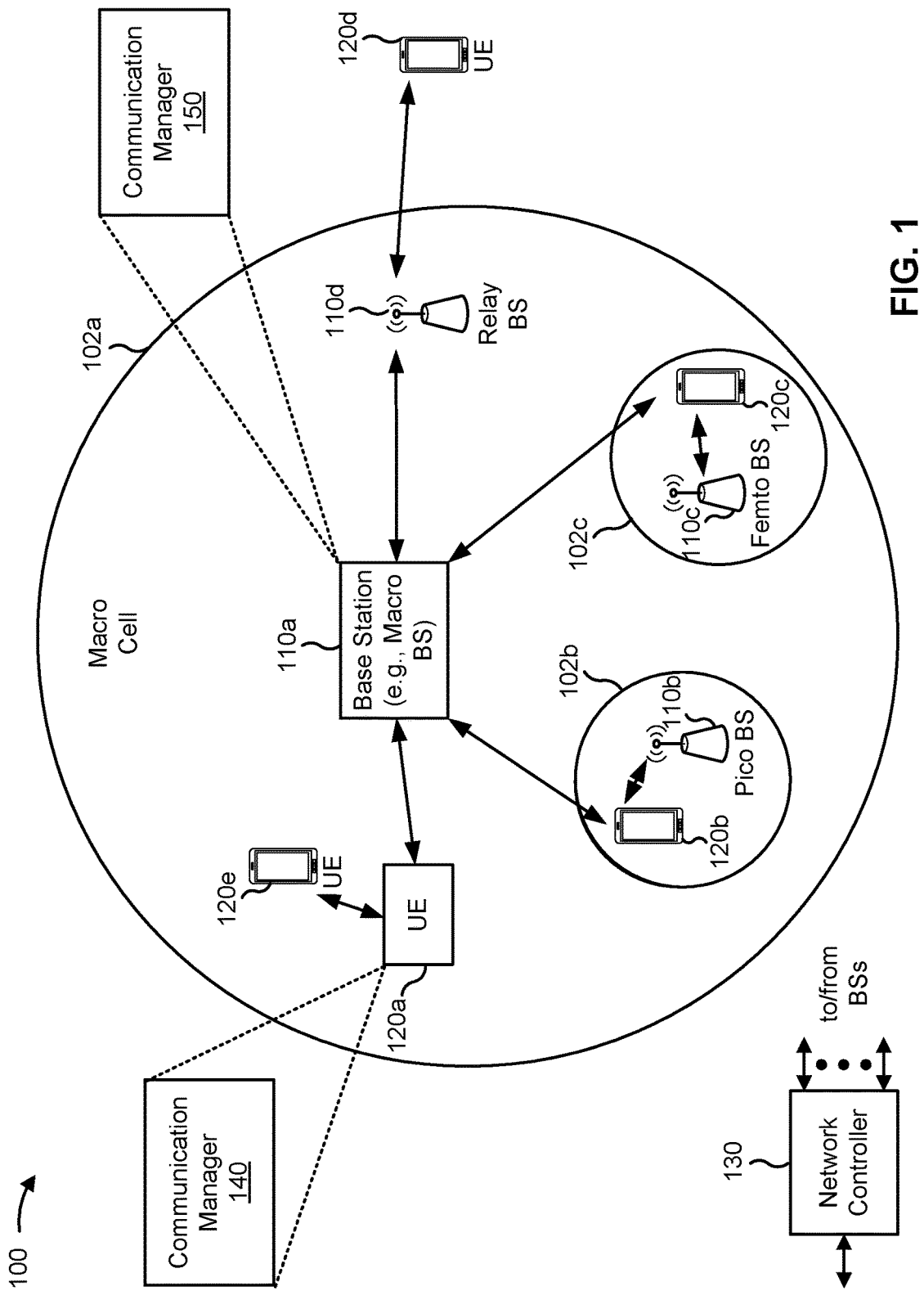
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may perform one or more operations associated with SSB beam forming. Additionally, or alternatively, the communication manager 140 may perform one or more other operations described herein.

In some aspects, the base station 110 may include a communication manager 150. As described in more detail elsewhere herein, the communication manager 150 may perform one or more operations associated with SSB beam forming. Additionally, or alternatively, the communication manager 150 may perform one or more other operations described herein.

As indicated above, FIG. 1 is provided as an example. Other examples may differ from what is described with regard to FIG. 1.

Figure 2:
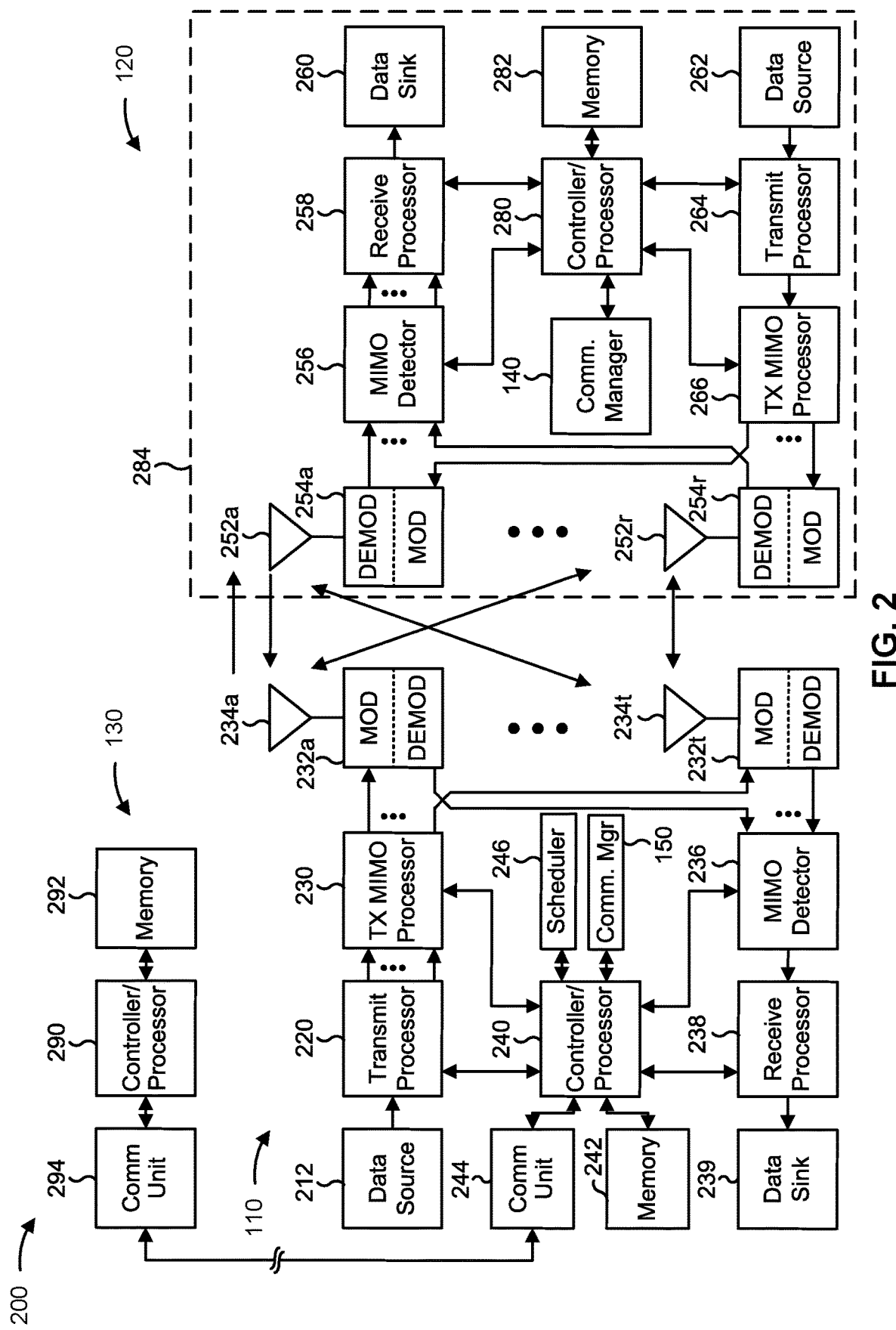
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-16.

Controller/processor 240 of base station 110, controller/processor 280 of UE 120, and/or any other component(s) of FIG. 2 may perform one or more techniques associated with SSB beam forming, as described in more detail elsewhere herein. For example, controller/processor 240 of base station 110, controller/processor 280 of UE 120, and/or any other component(s) of FIG. 2 may perform or direct operations of, for example, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, the UE includes means for identifying a base station capable of performing medium access control (MAC) based transmission configuration indication (TCI) switching; and/or means for deactivating an autonomous beam switching mode based at least in part on the base station being capable of performing MAC based TCI switching. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the UE includes means for transmitting a measurement report indicating a selected synchronization signal block; means for identifying a modified parameter based at least in part on a condition; and/or means for switching to the selected synchronization signal block in accordance with the modified parameter. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
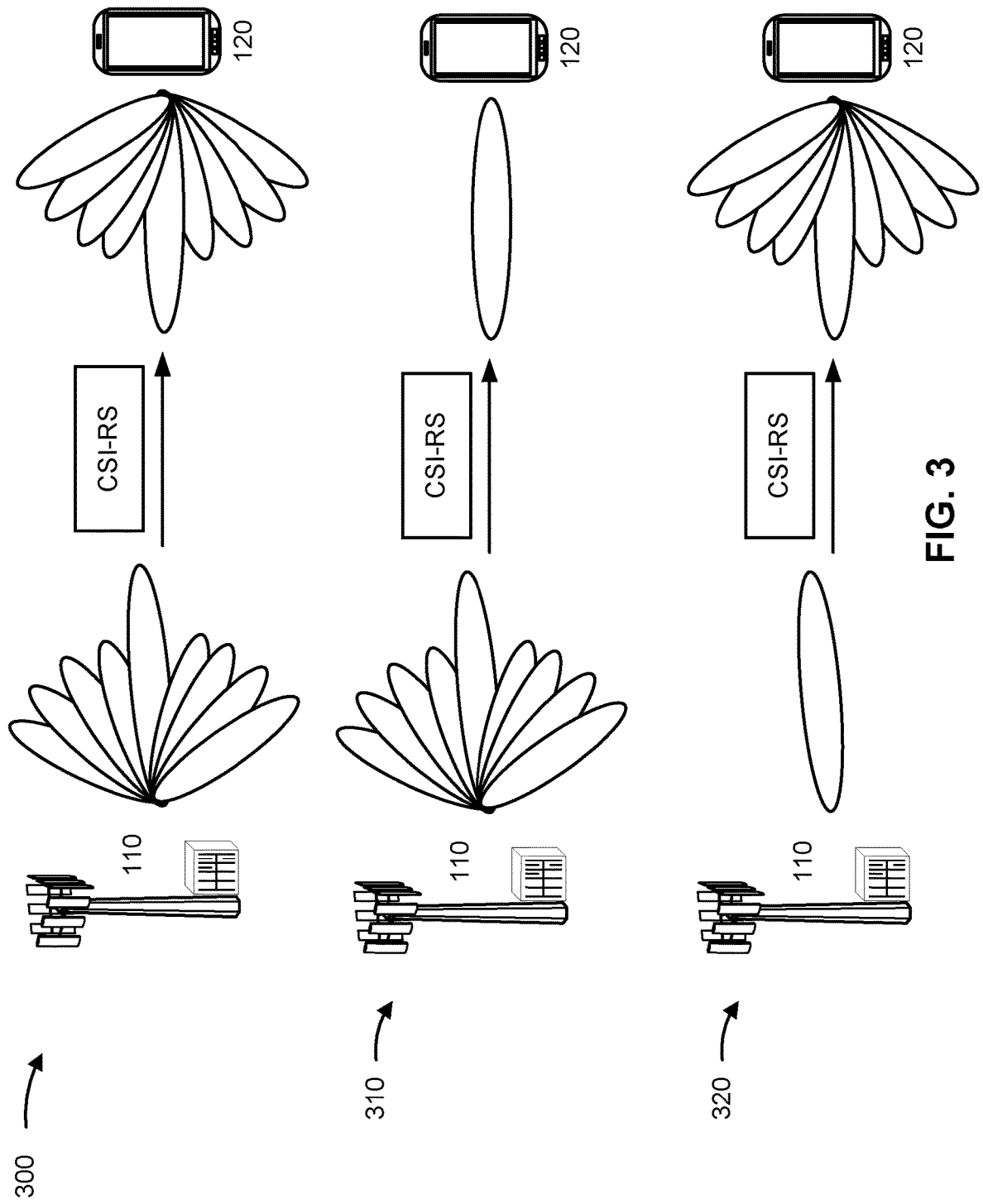
FIG. 3 is a diagram illustrating an example of reference signal beam management procedures, in accordance with the present disclosure.

FIG. 3 is a diagram illustrating examples 300, 310, and 320 of reference signal (RS) beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 3, example 300 may include a base station 110 and a UE 120 communicating to perform beam management using RSs, such as a channel state information (CSI) reference signal (CSI-RS), an SSB, and/or the like. Example 300 depicts a first beam management procedure (e.g., P1 RS beam management). The first beam management procedure may be referred to as a beam selection procedure, an initial beam acquisition procedure, a beam sweeping procedure, a cell search procedure, and/or a beam search procedure. As shown in FIG. 3 and example 300, RSs may be configured to be transmitted from the base station 110 to the UE 120. The RSs may be configured to be periodic (e.g., using RRC signaling), semi-persistent (e.g., using MAC control element (MAC-CE) signaling), and/or aperiodic (e.g., using downlink control information (DCI)).

The first beam management procedure may include the base station 110 performing beam sweeping over multiple transmit (Tx) beams. The base station 110 may transmit an RS (e.g., a CSI-RS, as shown) using each transmit beam for beam management. To enable the UE 120 to perform receive (Rx) beam sweeping, the base station may use a transmit beam to transmit (e.g., with repetitions) each RS at multiple times within the same RS resource set so that the UE 120 can sweep through receive beams in multiple transmission instances. For example, if the base station 110 has a set of N transmit beams and the UE 120 has a set of M receive beams, the RS may be transmitted on each of the N transmit beams M times so that the UE 120 may receive M instances of the RS per transmit beam. In other words, for each transmit beam of the base station 110, the UE 120 may perform beam sweeping through the receive beams of the UE 120. As a result, the first beam management procedure may enable the UE 120 to measure a RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120.

As shown in FIG. 3, example 310 may include a base station 110 and a UE 120 communicating to perform beam management using RSs, such as CSI-RSs, SSBs, and/or the like. Example 310 depicts a second beam management procedure (e.g., P2 RS beam management). The second beam management procedure may be referred to as a beam refinement procedure, a base station beam refinement procedure, a TRP beam refinement procedure, and/or a transmit beam refinement procedure. As shown in FIG. 3 and example 310, RSs (e.g., CSI-RSs, as shown) may be configured to be transmitted from the base station 110 to the UE 120. The RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a RS using each transmit beam of the one or more transmit beams for beam management. The UE 120 may measure each RS using a single (e.g., a same) receive beam (e.g., determined based at least in part on measurements performed in connection with the first beam management procedure). The second beam management procedure may enable the base station 110 to select a best transmit beam based at least in part on measurements of the RSs (e.g., measured by the UE 120 using the single receive beam) reported by the UE 120.

As shown in FIG. 3, example 320 depicts a third beam management procedure (e.g., P3 RS beam management). The third beam management procedure may be referred to as a beam refinement procedure, a UE beam refinement procedure, and/or a receive beam refinement procedure. As shown in FIG. 3 and example 320, one or more RSs (e.g., one or more CSI-RSs, one or more SSBs, and/or the like) may be configured to be transmitted from the base station 110 to the UE 120. The one or more RSs may be configured to be aperiodic (e.g., using DCI). The third beam management process may include the base station 110 transmitting the one or more RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the RS of the transmit beam using the one or more receive beams).

In some cases, a base station 110 may update a beam, such as by transmitting information to a UE 120 indicating one or more updated parameters for the beam, a synchronization signal block associated with the beam, or the like. For example, a base station 110 may update a beam as described with respect to FIG. 4. In some other cases, a UE 120 may autonomously select a beam. For example, a UE 120 may autonomously select a beam based on an SSB transmitted on the beam, such as based at least in part on a measurement associated with the SSB satisfying a threshold. The beam may be selected for data communication, loop tracking (e.g., open loop power control (OLPC) and closed loop power control (CLPC), synchronization, etc.), or the like.

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4:
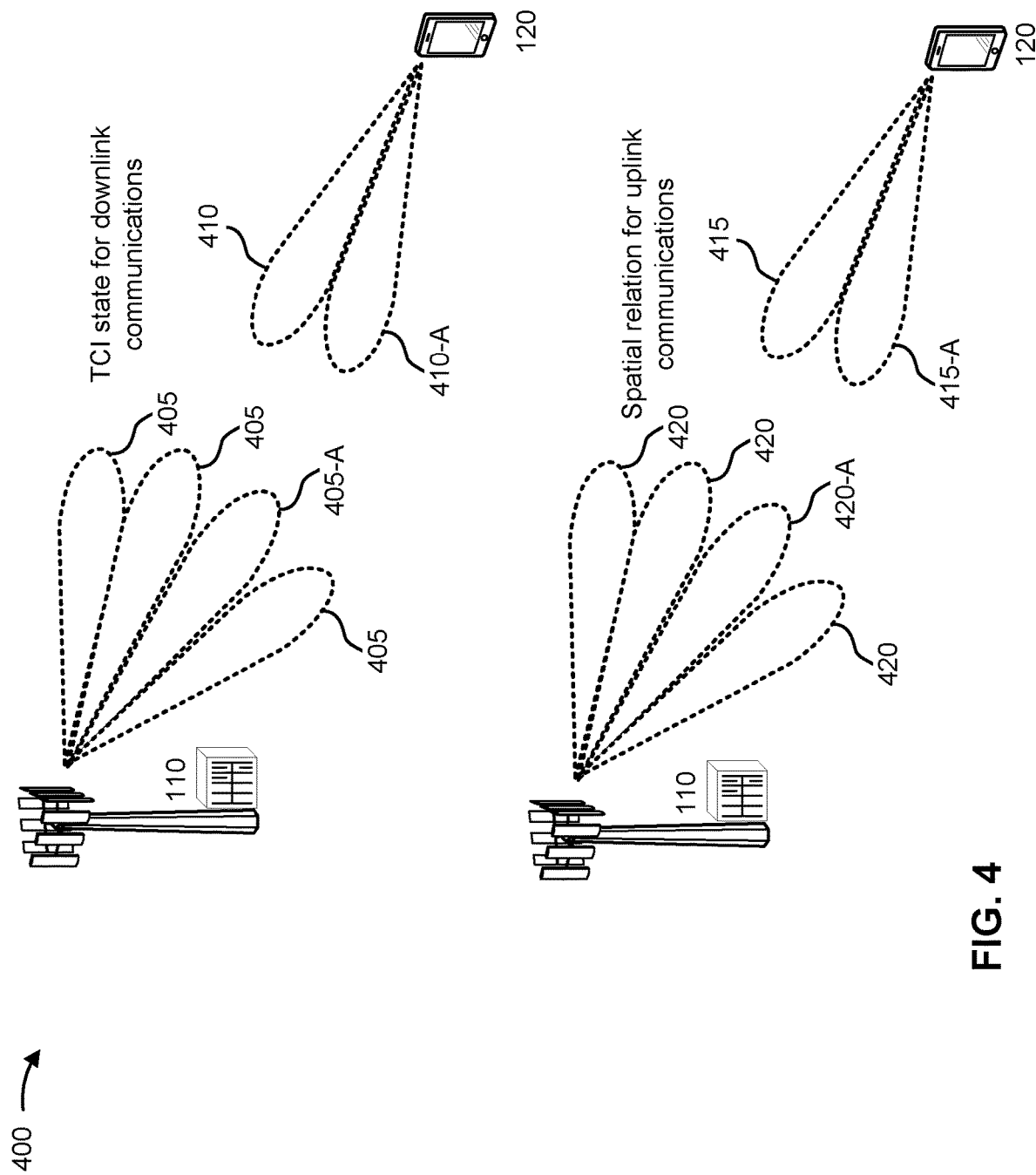
FIG. 4 is a diagram illustrating an example of using beams for communication between a base station and user equipment, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120.

In some cases, the base station 110 may signal information indicating a selected beam, such as via MAC signaling (e.g., a MAC control element (MAC-CE)). This is called MAC based beam switching. The MAC based beam switching may be achieved via signaling a TCI state (defined below), which is referred to herein as MAC based TCI switching, since MAC signaling may indicate an updated TCI state for a transmission or reception. In some other cases, the UE 120 may autonomously select a beam, such as a serving SSB associated with the beam, without receiving MAC signaling. For example, a UE 120 in an autonomous beam switching mode may select a beam, such as a serving SSB associated with the beam, and may switch from a previous serving SSB to the selected serving SSB without having received signaling (e.g., MAC signaling) from the base station. An autonomous beam switching mode is a mode in which the UE 120 is enabled to select and switch serving SSBs without receiving signaling from the base station 110 indicating a selected beam. A serving SSB is an SSB for which radio link management is performed. For example, radio link failure (RLF) may be declared based on monitoring a performance of a serving SSB or some communications may be transmitted via a beam of a serving SSB, among other examples. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more quasi-colocation (QCL) properties of the downlink beam. A QCL property is a parameter that can be derived from observing a source signal such as a downlink reference signal set. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (where a QCL type identifies a combination of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

In some instances, the base station 110 may direct the UE 120 to have a beam switch change from a current SSB to a new SSB. For example, the UE 120 may direct the UE 120 to have a beam switch from a current SSB to a new SSB based at least in part on beam reporting or random access channel (RACH) attempts from the UE. The base station 110 may transmit an RRC reconfiguration or MAC-CE down selection to direct the UE 120 to have the beam switch change from the current SSB to a new SSB. The beam switches may be needed to maintain a proper connection or to improve data throughput. However, in some cases, the base station 110 may not support MAC based TCI switching. For example, some base stations 110 may use an outdated configuration, or may not be configured to support MAC based TCI switching. Thus, the base station 110 may not be able to direct the UE 120 to have the beam switch based at least in part on the UE 120 being configured to utilize MAC based TCI switch, which may result in the UE 120 being unable to maintain a connection with the base station 110.

Some techniques and apparatuses described herein enable a UE to determine whether a base station supports MAC based TCI switching and/or to perform an autonomous beam switch (e.g., utilize an autonomous beam switching mode) when the base station does not support MAC based TCI switching. By performing the autonomous SSB beam switch when the base station does not support MAC based TCI switching, the UE may be able to maintain a connection with the base station or improve data throughput, among other examples. Furthermore, some techniques and apparatuses described herein provide adjustment of thresholds associated with autonomous beam switching based at least in part on conditions associated with the UE, such as channel conditions, radio link failure, or the like, which improves the efficacy of autonomous beam switching, thereby improving reliability of the connection with the base station.

As indicated above, FIG. 4 is provided as an example. Other examples may differ from what is described with respect to FIG. 4.

Figure 5:
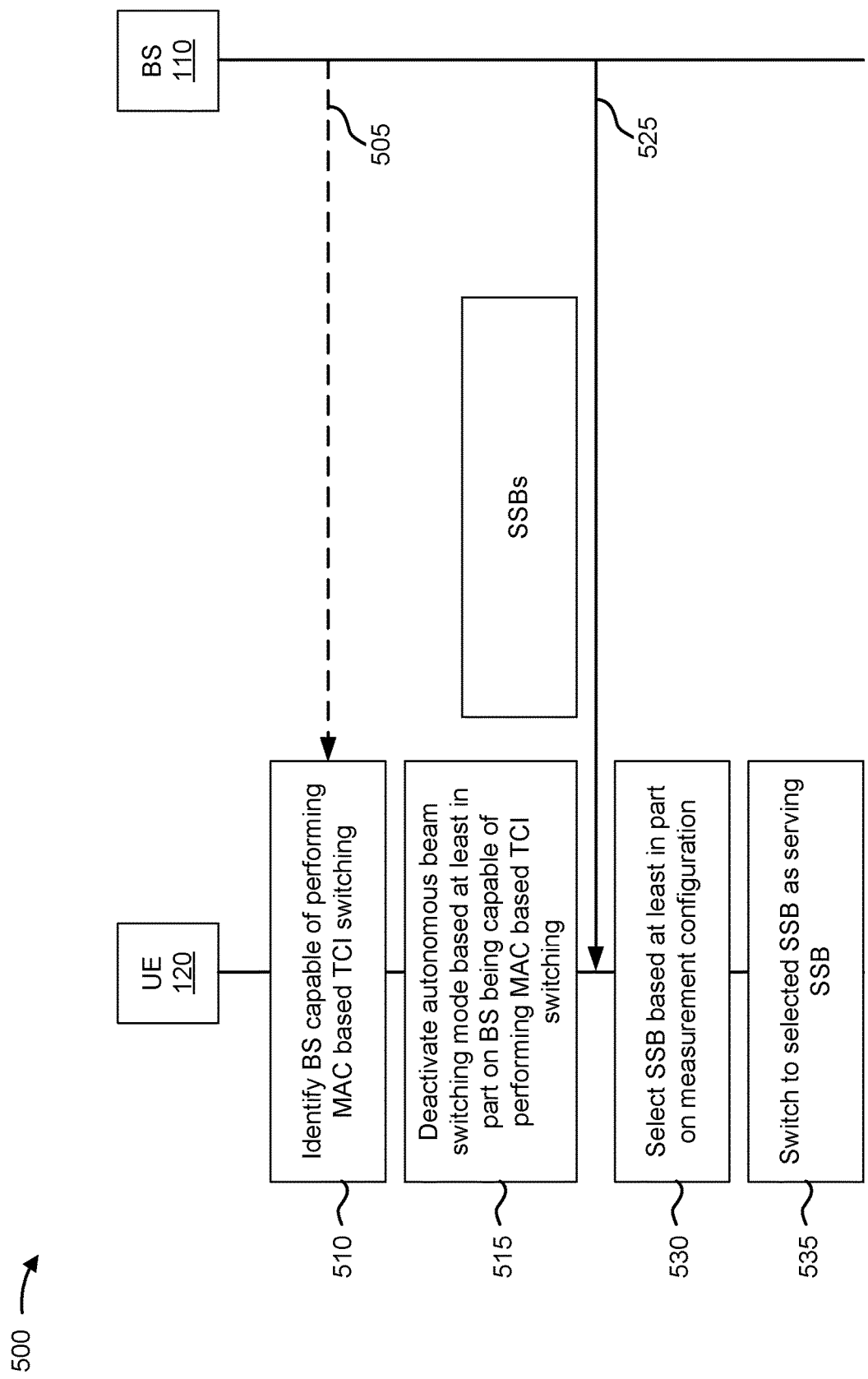
FIGS. 5-14 are diagrams illustrating examples associated with synchronization signal block beam switching, in accordance with the present disclosure.

FIG. 5 is a diagram illustrating an example 500 associated with SSB beam switching, in accordance with the present disclosure. As shown in FIG. 5, example 500 includes a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., an RRC connected state).

As shown by reference number 505, the base station 110 may communicate with UE 120. For example, the base station 110 may communicate with UE 120, based at least in part on the UE 120 being located within a coverage area of the base station 110, to perform beam management using RSs, and/or the like. In some aspects, the base station 110 communicates to perform beam management using RSs configured to be transmitted from the base station 110 to the UE 120. The RSs may be configured to be periodic (e.g., using RRC signaling), semi-persistent (e.g., using MAC-CE signaling), or aperiodic (e.g., using DCI).

As shown by reference number 510, the UE 120 may identify whether the base station 110 is capable of performing MAC based TCI switching. In some aspects, the UE 120 may identify whether the base station 110 is capable of performing MAC based TCI switching based at least in part on receiving a transmission from the base station 110 (such as shown by reference number 505). In some aspects, the base station 110 may signal information indicating a selected beam or indicating an SSB switch, among other examples, via MAC based beam switching. The MAC based beam switching may be achieved via signaling a TCI state in MAC signaling. The UE 120 may identify the base station 110 as being capable of performing MAC based TCI switching based at least in part on the MAC based beam switching indicating the selected beam or the SSB switch. "MAC based beam switching" is used interchangeably with "MAC based TCI switching" herein.

In some aspects, the communication includes a reply to a message transmitted by the UE 120 to the base station 110. For example, the UE 120 may provide an L1-RSRP report to the base station 110. The L1-RSRP report may indicate a request associated with the UE 120 switching from the serving SSB to another SSB. The UE 120 may start a timer based at least in part on providing the L1-RSRP report to the base station 110. The UE 120 may determine whether a response to the L1-RSRP (e.g., a response associated with MAC based beam switching) is received prior to expiration of the timer. The UE 120 may determine that the base station 110 is capable of performing MAC based TCI switching when the response is received prior to the expiration of the timer.

In some aspects, the UE 120 may identify whether the base station 110 is capable of performing MAC based TCI switching based at least in part on accessing a data structure (e.g., a database, a table, a list, and/or the like) storing information associated with base stations 110. In some aspects, the information associated with the base stations 110 includes information indicating whether a base station 110, of the base stations 110, is capable of performing MAC based TCI switching. The UE 120 may access the data structure and may identify a base station 110 capable of performing MAC based TCI switching based on the information associated with the base station 110 stored in the data structure.

In some aspects, the information associated with the base stations 110 includes geographical information associated with the base stations 110. The geographical information associated with a base station 110, of the base stations 110, may include information identifying a geographical location of the base station 110 (e.g., a latitude, a longitude, a street address, a name of a city, a tracking area, a country code, a region, and/or the like). The UE 120 may determine a geographical location of the UE 120 and may identify a base station 110 serving the geographical location of the UE 120 based on the information associated with the base stations 110 stored in the data structure. The UE 120 may determine whether the base station 110 serving the geographical location of the UE 120 is capable of performing MAC based TCI switching based on the information associated with the base station 110.

In some aspects, the information associated with the base stations 110 indicates that the base station 110 is capable of performing MAC based TCI switching based at least in part on another base station 110 being capable of performing MAC based TCI switching. The UE 120 may identify another base station 110 associated with the geographical location of the UE 120 based on the information associated with the base stations 110 stored in the data structure. The UE 120 may determine that the other base station 110 is associated with the base station 110 serving the geographical location of the UE 120 based at least in part on the other base station 110 being associated with the geographical location of the UE 120.

The information associated with the other base station 110 may indicate that the other base station 110 is capable of performing MAC based TCI switching. The UE 120 may determine that the base station 110 serving the geographical location of the UE 120 is capable of performing MAC based TCI switching based at least in part on the other base station 110 being associated with the geographical location of the UE 120 and based at least in part on the other base station 110 being associated with the base station 110 serving the geographical location of the UE 120.

In some aspects, the UE 120 identifies whether the base station 110 is capable of performing MAC based TCI switching based at least in part on configuration information received by the UE 120, such as configuration information signaled via radio resource control (RRC) signaling or the like. In some aspects, the configuration information identifies a beam failure parameter, and the UE 120 identifies whether the base station 110 is capable of performing MAC based TCI switching based at least in part on the beam failure parameter. A beam failure parameter may include, for example, a failure detection resource (associated with a reference signal), a counter associated with beam failure detection, a timer associated with beam failure detection, one or more reference signals to monitor, or the like. In some aspects, the beam failure parameter may include one or more parameters for beam failure recovery, such as a root sequence, a RACH configuration, a measurement threshold, a reference signal list, or the like.

In some aspects, the UE 120 may determine that the base station 110 is not capable of performing MAC based TCI switching. If the UE 120 determines that the base station 110 is not capable of performing MAC based TCI switching, the UE 120 may utilize an autonomous beam switching mode and may autonomously select a beam (that is, without receiving an indication of which beam to select), such as a serving SSB associated with the beam. The UE 120 may autonomously select the serving SSB associated with the beam without receiving MAC signaling from the base station 110.

In some aspects, the UE 120 may determine that the base station 110 is capable of performing MAC based TCI switching. As shown by reference number 515, the UE 120 deactivates the autonomous beam switching mode based at least in part on the base station 110 being capable of performing MAC based TCI switching. The UE 120 may deactivate the autonomous beam switching mode to prevent the UE 120 from autonomously selecting the serving SSB.

In this way, the UE 120 may prevent the UE 120 and the base station 110 from identifying different SSBs as the serving SSB.

In some aspects, the UE 120 may deactivate the autonomous beam switching mode based at least in part on determining that beam failure parameters are configured by the base station 110. The UE 120 may determine that the base station 110 supports network-side beam management based at least in part on the beam failure parameters being configured by the base station 110. The UE 120 may deactivate the autonomous beam switching mode based at least in part on the base station 110 supporting network-side beam management. In this way, the UE 120 may prevent the UE 120 from becoming out of synchronization with the base station 110 with respect to the beam management.

In some aspects, the UE 120 may deactivate the autonomous beam switching mode based at least in part on determining that the base station 110 configures a CSI-based L1-RSRP report. An L1-RSRP report is a measurement report that conveys L1-RSRP information for a set of beams. A CSI-based L1-RSRP report is a measurement report in which the L1-RSRP information is determined using CSI-RSs. The UE 120 may determine that the base station 110 supports network-side beam management based at least in part on the CSI-RS based L1-RSRP report. Because performing beam management using SSBs may sometimes provide different beam management results than performing beam management using CSI-RSs, the UE 120 may deactivate the autonomous beam switching mode to avoid conflicting beam management results or to prevent the UE 120 from becoming out of synchronization with the base station 110 with respect to the beam management.

As shown by reference number 525, the UE 120 receives SSBs from the base station 110. As shown by reference number 530, the UE 120 selects an SSB based at least in part on a measurement configuration. As an example, the UE 120 may attempt to receive downlink transmissions via one or more UE receive beams, which may be configured using different beamforming parameters by the UE 120. The UE 120 may identify a particular BS transmit beam and a particular UE receive beam that provide relatively favorable performance (for example, that have a best channel quality of the different measured combinations of BS transmit beams and UE receive beams). In some aspects, the UE 120 may transmit an indication of which BS transmit beam is identified by the UE 120 as a preferred BS transmit beam, which the base station 110 may select for transmissions to the UE 120. As shown by reference number 535, the UE 120 may switch to the selected SSB as the serving SSB. For example, the UE may perform the autonomous beam switch, or may switch in accordance with signaling transmitted by the base station 110.

As indicated above, FIG. 5 is provided as an example. Other examples may differ from what is described with respect to FIG. 5.

Figure 6:
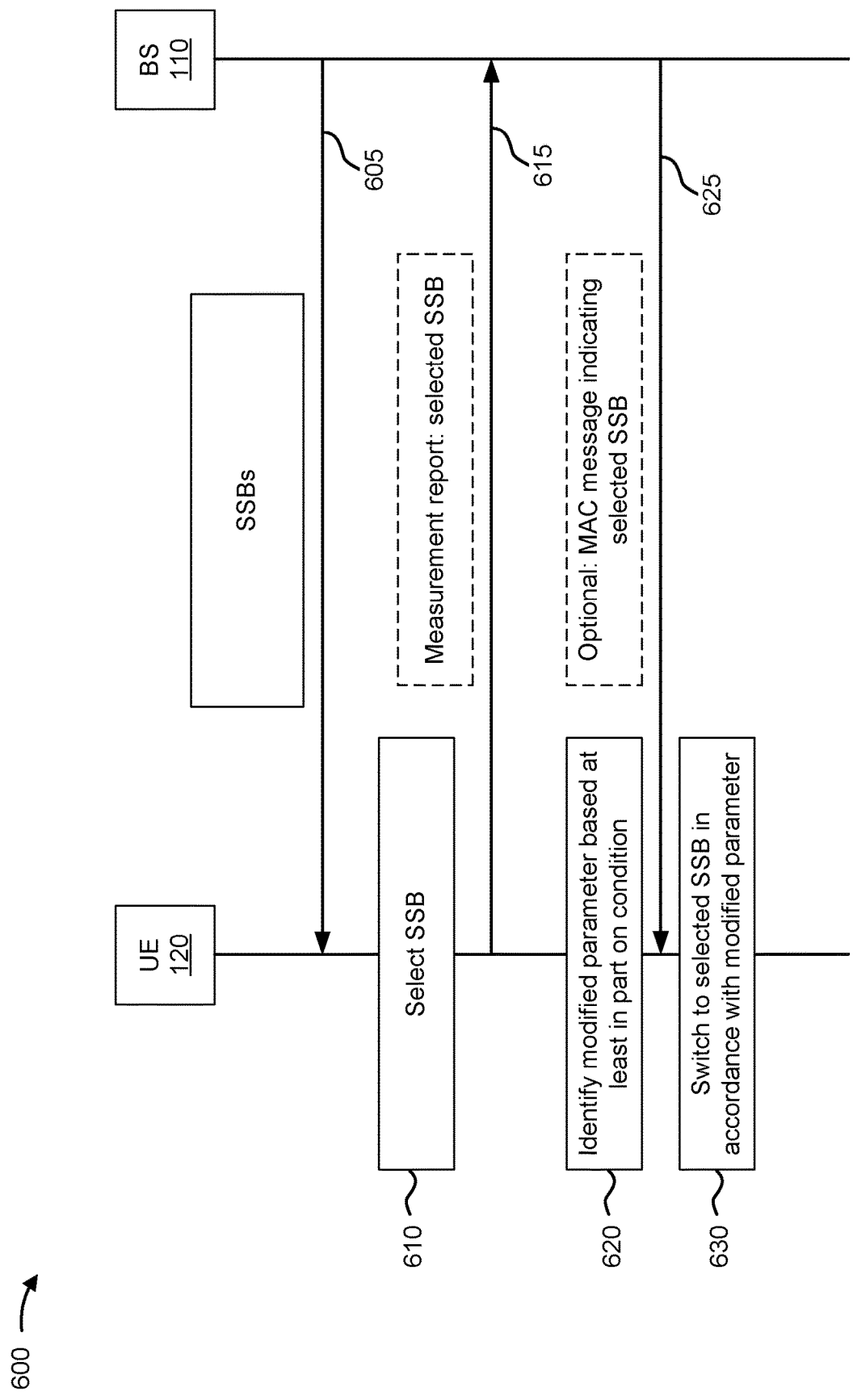

FIG. 6 is a diagram illustrating an example 600 associated with SSB beam switching, in accordance with the present disclosure. As shown in FIG. 6, example 600 includes a UE 120 in communication with a base station 110 in a wireless network (e.g., wireless network 100). However, the devices shown in FIG. 6 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As show by reference number 605, the UE 120 receives SSBs from the base station 110. In some aspects, the UE 120 may receive the SSBs from the base station 110 as described elsewhere herein.

As shown by reference number 610, the UE 120 selects an SSB. In some aspects, the UE 120 may select an SSB, from the SSBs received from the base station 110, as described elsewhere herein.

As shown by reference number 615, the UE 120 may optionally provide a measurement report indicating a selected SSB to the base station 110. In some aspects, the UE 120 may transmit the measurement report based at least in part on a measurement value associated with the selected SSB satisfying a threshold. For example, the UE 120 may transmit the measurement report based at least in part on a measurement value such as an RSRP. The UE 120 may determine that a difference between an RSRP signal associated with the selected SSB and an RSRP signal associated with a serving SSB satisfies a difference threshold. The UE 120 may provide the measurement report indicating the selected SSB to the base station 110 based on the difference satisfying the difference threshold.

In some aspects, the RSRP associated with the selected SSB and/or the serving SSB is a filtered RSRP. A filtered RSRP is an RSRP that is a combination of a most recently measured RSRP and one or more prior RSRP measurements (such as a prior filtered RSRP or a prior unfiltered RSRP). The usage of the filtered RSRP may prevent RSRP measurements from being distorted by fast fading in the channel. By selecting the SSB (that is, performing autonomous beam switching) using the filtered RSRP, the UE 120 reduces the occurrence of unnecessary SSB switching due to measurement noise or inaccuracy.

In some aspects, the UE 120 may dynamically adjust the difference threshold based at least in part on sensing information associated with the condition. For example, the UE 120 may determine a signal-to-noise ratio (SNR) associated with communicating with the base station 110. The UE 120 may determine that the SNR satisfies an SNR threshold. The UE 120 may modify the difference threshold based at least in part on the SNR satisfying the SNR threshold. For example, the UE 120 may increase a value of the difference threshold when the SNR satisfies the SNR threshold based at least in part on a throughput gain being limited at an SNR that satisfies the SNR threshold.

As shown by reference number 620, the UE 120 identifies a modified parameter based at least in part on a condition. In some aspects, the modified parameter is modified relative to a baseline parameter. The baseline parameter may indicate an offset for a measurement threshold related to reporting the selected SSB (e.g., the difference between the filtered RSRP signal associated with the selected SSB and the filtered RSRP signal associated with a serving SSB satisfies the difference threshold).

In some aspects, the condition is associated with an RLF timer (such as a T310 timer) being active, indicating that the UE 120 is likely to be undergoing RLF. The UE 120 may identify the modified parameter based on the probability associated with an occurrence of an RLF satisfying the probability threshold. For example, the UE 120 may reduce a difference threshold such that the UE 120 switches SSBs more aggressively than when using the baseline parameter.

As shown by reference number 625, in some aspects, the UE 120 may receive MAC messaging indicating the selected SSB from the base station 110. In these aspects, the UE 120 may determine that the base station 110 is capable of performing MAC based TCI switching based at least in part on receiving the MAC messaging indicating the selected SSB from the base station 110. The UE 120 may deactivate an autonomous SSB switching based at least in part on the base station 110 being capable of performing MAC based TCI switching.

As shown by reference number 630, the UE 120 may switch to the selected SSB in accordance with the modified parameter. In some aspects, the UE 120 may switch to the selected SSB in accordance with the modified parameter based at least in part on not receiving MAC messaging indicating the selected SSB from the base station 110 prior to an expiration of a timer. For example, the UE 120 may start a timer based at least in part on transmitting the measurement report to the base station 110. The UE 120 may determine that the base station 110 is not capable of performing MAC based TCI switching based at least in part on not receiving MAC messaging indicating the selected SSB from the base station 110 prior to the expiration of the timer. The UE 120 may switch to the selected SSB in accordance with the modified parameter based on the base station 110 not being capable of performing MAC based TCI switching.

As indicated above, FIG. 6 is provided as an example. Other examples may differ from what is described with respect to FIG. 6.

Figure 7:
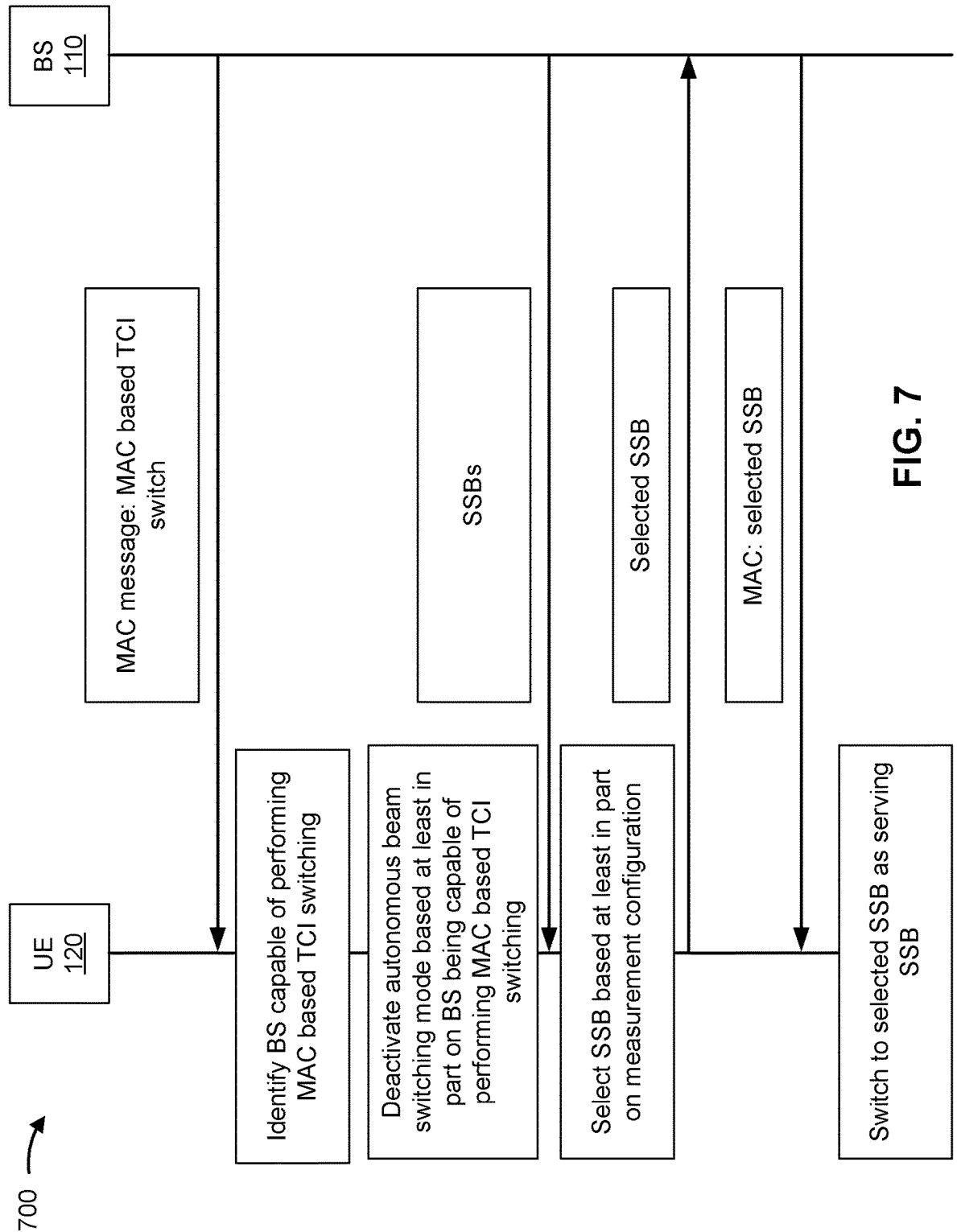

FIG. 7 is a diagram illustrating an example 700 associated with SSB beam switching, in accordance with the present disclosure. As shown in FIG. 7, example 700 includes a UE 120 in communication with a base station 110 in a wireless network (e.g., wireless network 100). However, the devices shown in FIG. 7 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 7, the UE 120 may receive a MAC message from the base station 110. The MAC message may be associated with performing MAC based TCI switching. The UE 120 may identify the base station 110 as being capable of performing MAC based TCI switching based on receiving the MAC message from the base station 110. The UE 120 may deactivate an autonomous beam switching mode based at least in part on the base station 110 being capable of performing MAC based TCI switching.

The UE 120 may receive SSBs from the base station 110. The UE 120 may select an SSB, from the SSBs, based at least in part on a measurement configuration, as described elsewhere herein, and based at least in part on the UE having deactivated the autonomous beam switching. The UE 120 may report the selected SSB to the base station 110. The base station 110 may transmit, to the UE 120, MAC signaling indicating to switch to the selected SSB as the serving SSB.

As indicated above, FIG. 7 is provided as an example. Other examples may differ from what is described with respect to FIG. 7.

Figure 8:
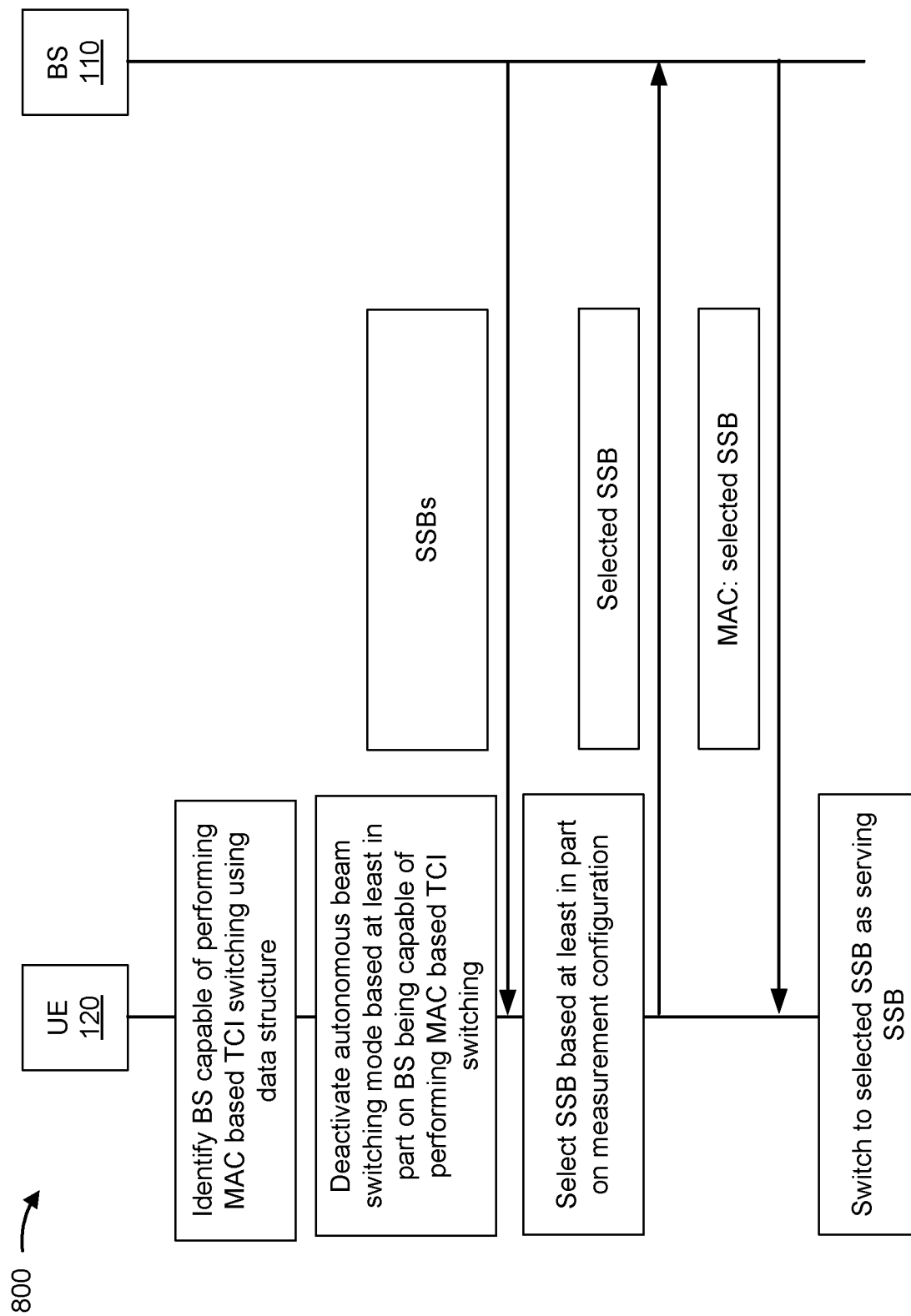

FIG. 8 is a diagram illustrating an example 800 associated with SSB beam switching, in accordance with the present disclosure. As shown in FIG. 8, example 800 includes a UE 120 in communication with a base station 110 in a wireless network (e.g., wireless network 100). However, the devices shown in FIG. 8 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 8, the UE 120 may identify the base station 110 as being capable of performing MAC based TCI switching based at least in part on information stored in a data structure, as described elsewhere herein. The UE 120 may deactivate an autonomous beam switching mode based at least in part on the base station 110 being capable of performing MAC based TCI switching.

The UE 120 may receive SSBs from the base station 110. The UE 120 may select an SSB, from the SSBs, based at least in part on a measurement configuration, as described elsewhere herein, and based at least in part on the UE having deactivated the autonomous beam switching. The UE 120 may report the selected SSB to the base station 110. The base station 110 may transmit, to the UE 120, MAC signaling indicating to switch to the selected SSB as the serving SSB. The UE 120 may switch to the selected SSB as the serving SSB.

As indicated above, FIG. 8 is provided as an example. Other examples may differ from what is described with respect to FIG. 8.

Figure 9:
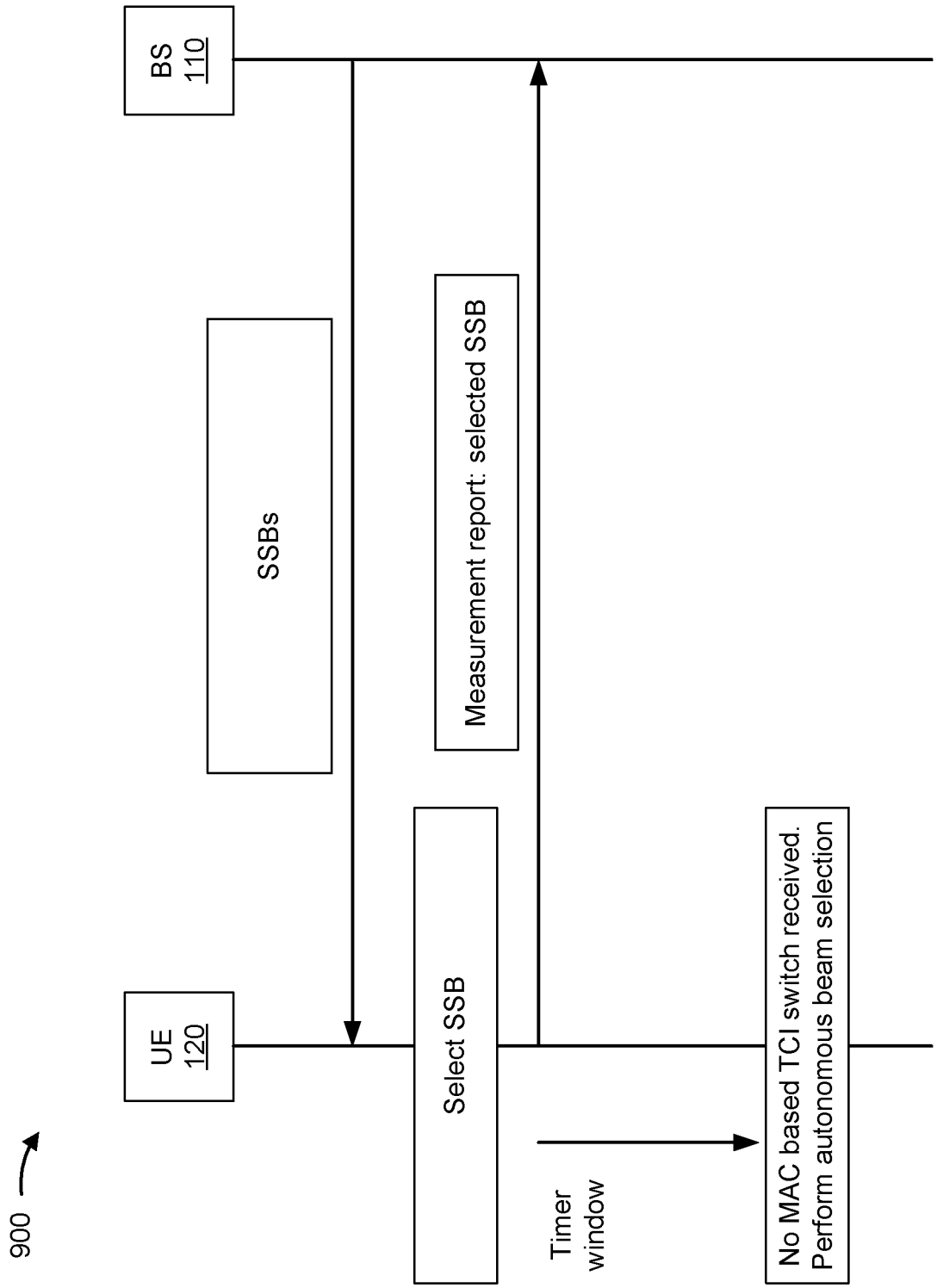

FIG. 9 is a diagram illustrating an example 900 associated with SSB beam switching, in accordance with the present disclosure. As shown in FIG. 9, example 900 includes a UE 120 in communication with a base station 110 in a wireless network (e.g., wireless network 100). However, the devices shown in FIG. 9 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 9, the UE 120 may receive SSBs from the base station 110. The UE 120 may select an SSB, from the SSBs, based at least in part on a measurement configuration, as described elsewhere herein. The UE 120 may provide a measurement report to the base station 110 based at least in part on selecting the SSB. The measurement report may indicate the selected SSB. The UE 120 may start a timer based at least in part on providing the measurement report to the base station 110.

The UE 120 may determine that a MAC based TCI switch is not received prior to an expiration of the timer. The UE 120 may identify the base station 110 as not being capable of performing MAC based TCI switching based on a MAC based TCI switch not being received prior to the expiration of the timer. The UE 120 may perform autonomous beam selection based on the base station 110 not being capable of performing MAC based TCI switching. If the UE 120 received MAC signaling from the base station 110 indicating a TCI switch prior to the expiration of the timer, then the UE 120 may deactivate autonomous beam selection.

As indicated above, FIG. 9 is provided as an example. Other examples may differ from what is described with respect to FIG. 9.

Figure 10:
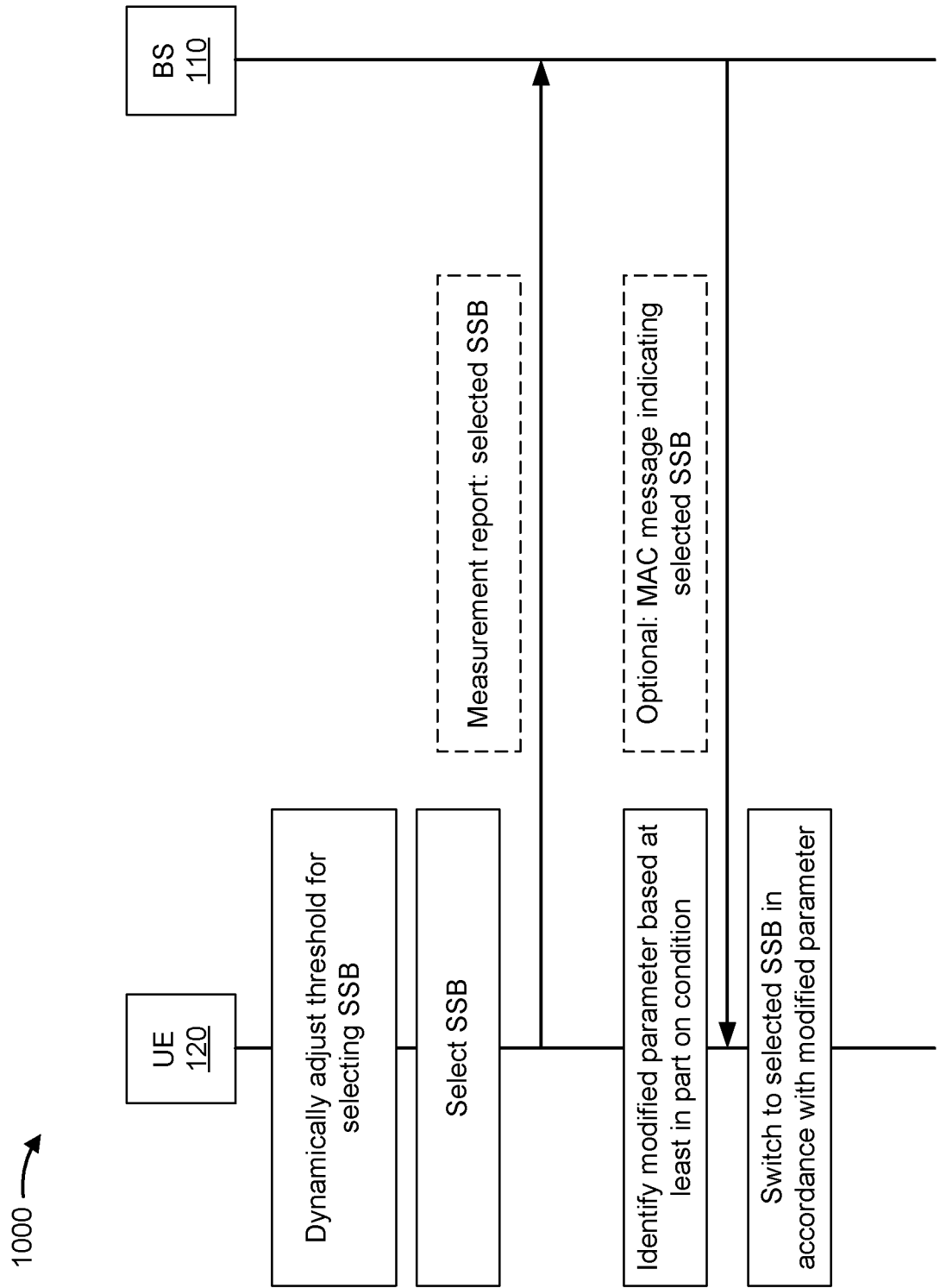

FIG. 10 is a diagram illustrating an example 1000 associated with SSB beam switching, in accordance with the present disclosure. As shown in FIG. 10, example 1000 includes a UE 120 in communication with a base station 110 in a wireless network (e.g., wireless network 100). However, the devices shown in FIG. 10 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 10, the UE 120 may dynamically adjust a threshold for selecting an SSB. For example, the UE 120 may dynamically adjust a threshold for selecting an updated serving SSB, as described elsewhere herein in connection with FIGS. 5 and 6. In some aspects, the threshold may be for measurement reporting associated with SSB selection. In some other aspects, the threshold may be for autonomous beam selection. The UE 120 may select an SSB based at least in part on dynamically adjusting the threshold. The UE 120 may optionally provide a measurement report indicating the selected SSB to the base station 110.

The UE 120 may identify a modified parameter based at least in part on a condition. For example, the UE 120 may identify a modified parameter based at least in part on a condition, as described elsewhere herein. In some aspects, the modified parameter may be associated with the dynamically adjusted threshold. For example, the modified parameter may indicate the threshold. In some aspects, the UE 120 receives MAC messaging indicating the selected SSB from the base station 110, such as if the UE 120 provides the measurement report and the base station 110 supports MAC based TCI switching.

In some aspects, the UE 120 does not receive the MAC messaging. The UE 120 may identify the UE 120 as not being capable of performing MAC based TCI switching based on not receiving the MAC messaging (e.g., prior to expiration of a timer). The UE 120 may switch to the selected SSB in accordance with the modified parameter based at least in part on the base station 110 not being capable of performing MAC based TCI switching.

As indicated above, FIG. 10 is provided as an example. Other examples may differ from what is described with respect to FIG. 10.

Figure 11:
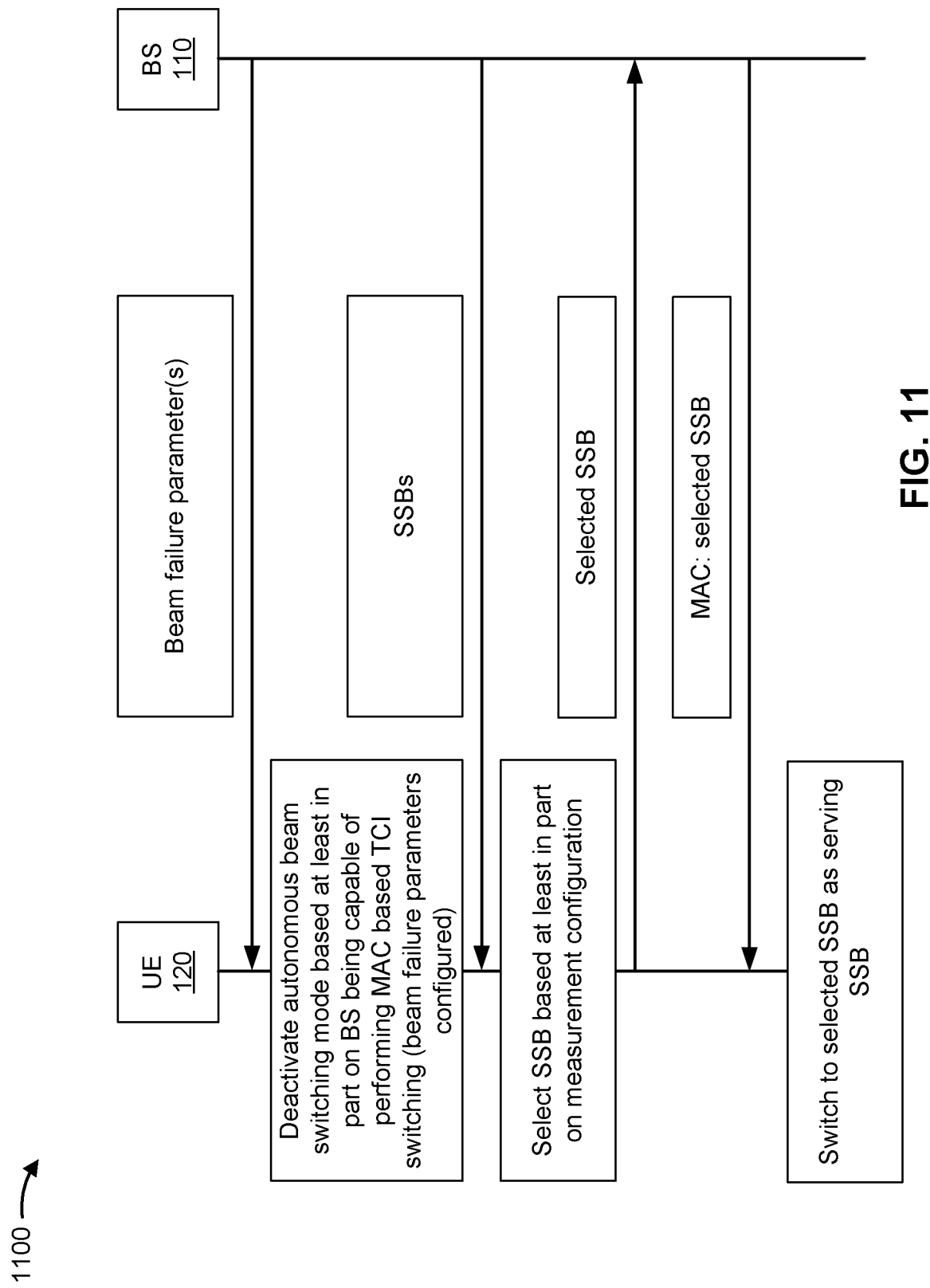

FIG. 11 is a diagram illustrating an example 1100 associated with SSB beam switching, in accordance with the present disclosure. As shown in FIG. 11, example 1100 includes a UE 120 in communication with a base station 110 in a wireless network (e.g., wireless network 100). However, the devices shown in FIG. 11 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 11, the UE 120 receives beam failure parameters from the base station 110, as described above in connection with FIG. 5. The UE 120 may determine that the base station 110 is capable of performing MAC based TCI switching based on receiving the beam failure parameters from the base station 110. The UE 120 may deactivate an autonomous switching mode based at least in part on the base station 110 being capable of performing MAC based TCI switching.

The UE 120 may receive SSBs from the base station 110. The UE 120 may select an SSB, from the SSBs, based at least in part on a measurement configuration, as described elsewhere herein. The UE 120 may transmit, to the base station 110, information indicating the selected SSB. The base station 110 may provide signaling indicating to switch to the selected SSB as a serving SSB. The UE 120 may switch to the selected SSB as the serving SSB.

As indicated above, FIG. 11 is provided as an example. Other examples may differ from what is described with respect to FIG. 11.

Figure 12:
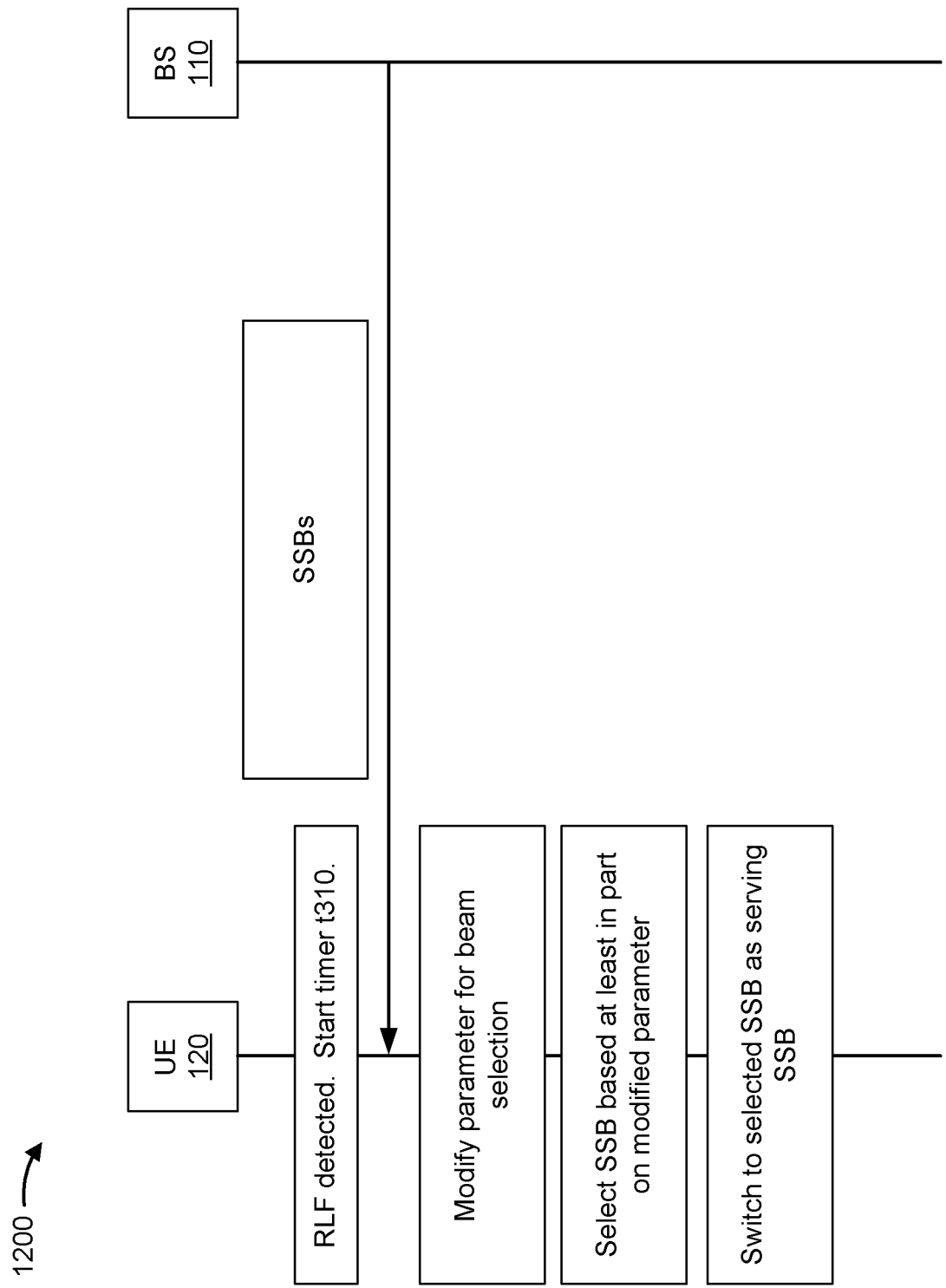

FIG. 12 is a diagram illustrating an example 1200 associated with SSB beam switching, in accordance with the present disclosure. As shown in FIG. 12, example 1200 includes a UE 120 in communication with a base station 110 in a wireless network (e.g., wireless network 100). However, the devices shown in FIG. 12 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 12, the UE 120 may detect RLF. The UE 120 may start a timer (e.g., timer T310) based on detecting RLF. The UE 120 may receive SSBs from the base station 110. The UE 120 may modify a parameter for beam selection based at least in part on detecting the RLF or the timer being started. For example, the parameter may indicate a threshold for selecting a beam, such as a threshold for an SSB measurement (e.g., a difference threshold or another form of threshold). The UE 120 may select an SSB based at least in part on the modified parameter. The UE 120 may switch to the SSB as the serving SSB and may provide information associated with the serving SSB to the base station 110.

As indicated above, FIG. 12 is provided as an example. Other examples may differ from what is described with respect to FIG. 12.

Figure 13:
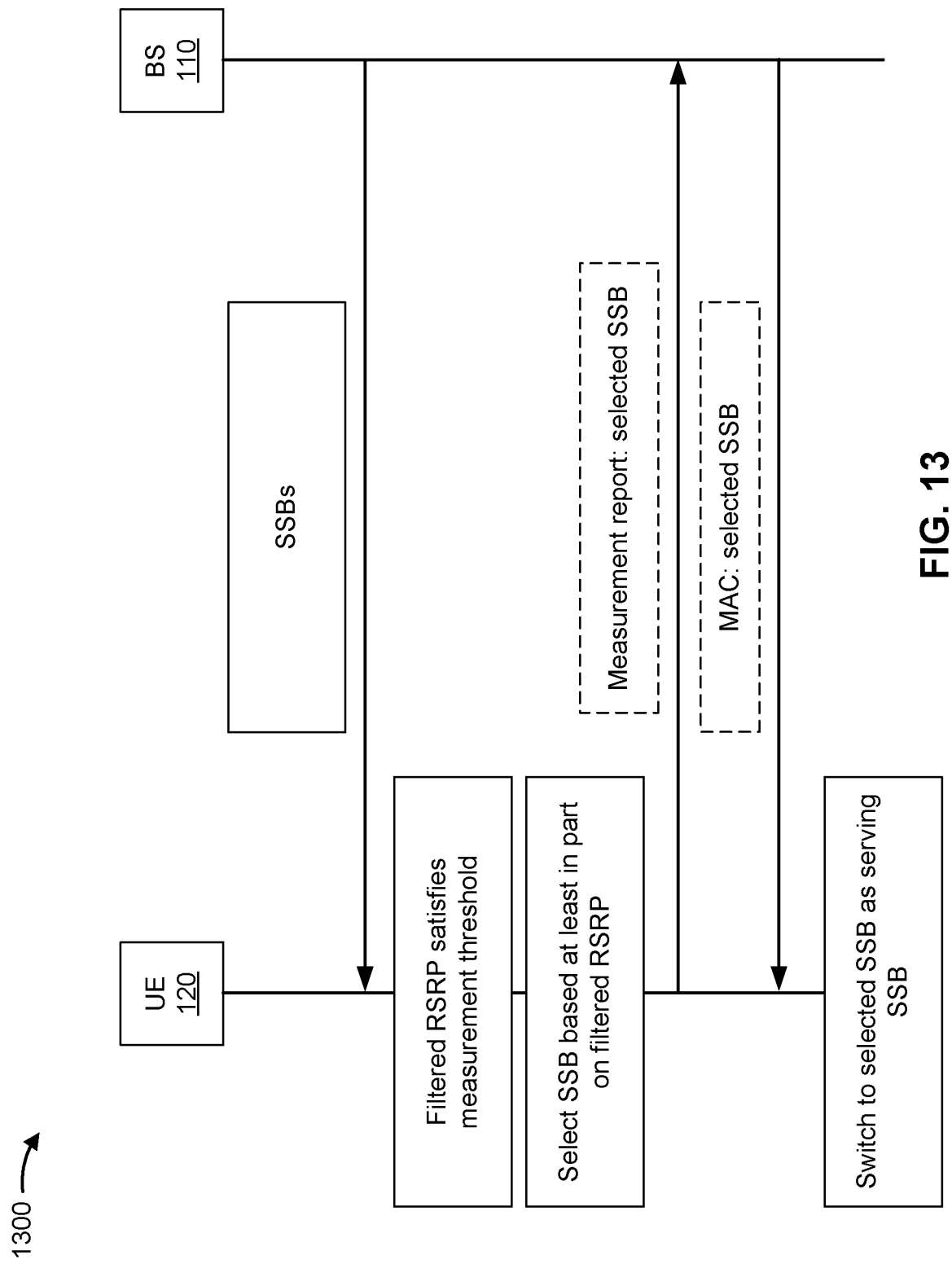

FIG. 13 is a diagram illustrating an example 1300 associated with SSB beam switching, in accordance with the present disclosure. As shown in FIG. 13, example 1300 includes a UE 120 in communication with a base station 110 in a wireless network (e.g., wireless network 100). However, the devices shown in FIG. 13 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 13, the UE 120 receives an SSB from the base station 110. The UE 120 may determine that a filtered RSRP satisfies a measurement threshold. For example, the UE 120 may determine that a difference between a filtered RSRP associated with a serving SSB and a filtered RSRP associated with an SSB of the SSBs received from the base station 110 satisfies a threshold difference, as described elsewhere herein.

The UE 120 may select an SSB, from the SSBs received from the base station 110, based at least in part on the filtered RSRP. In some aspects, the UE 120 may perform autonomous beam selection, and may switch to the selected SSB as a serving SSB without receiving MAC signaling from the base station 110. In some other aspects, as shown, the UE 120 may signal information indicating the selected SSB (such as a measurement report). The UE 120 may receive MAC signaling indicating to switch to the selected SSB as the serving SSB. The UE 120 may switch to the selected SSB as the serving SSB.

As indicated above, FIG. 13 is provided as an example. Other examples may differ from what is described with respect to FIG. 13.

Figure 14:
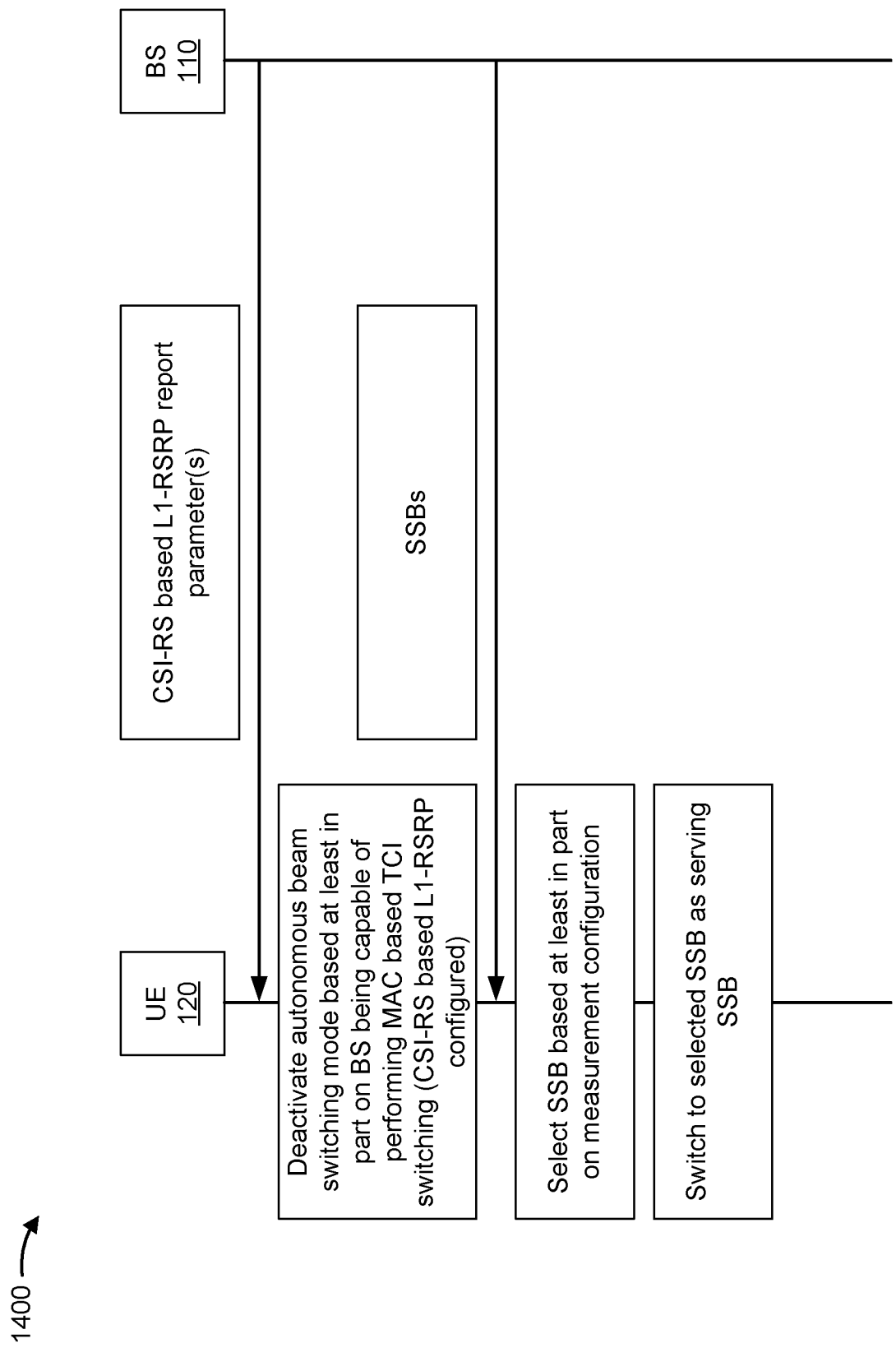
Figure 15:
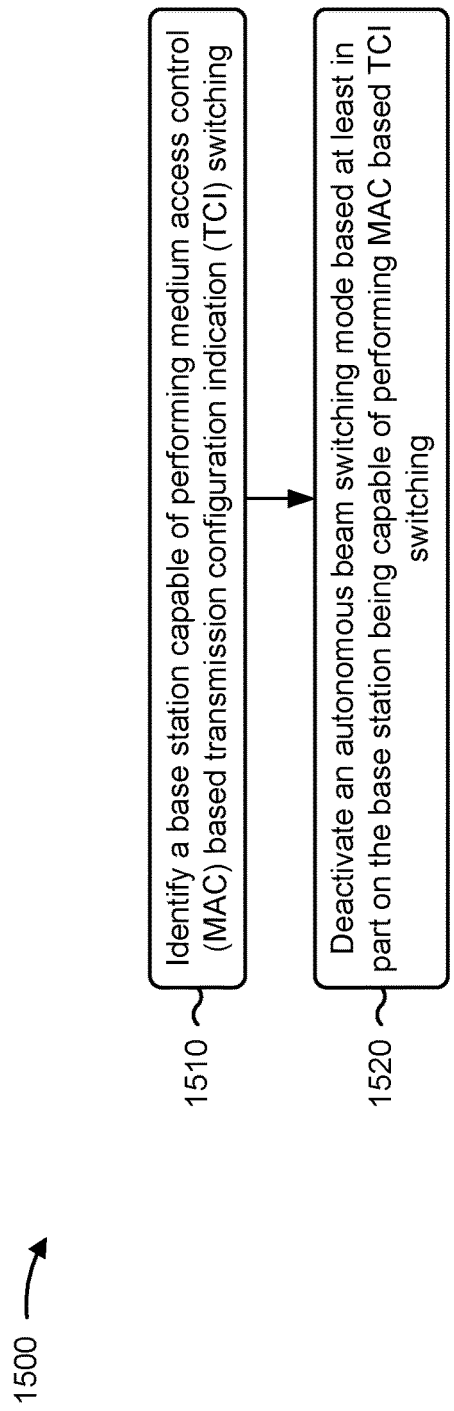
FIGS. 15 and 16 are diagrams illustrating example processes associated with synchronization signal block beam switching, in accordance with the present disclosure.

FIG. 14 is a diagram illustrating an example 1400 associated with SSB beam switching, in accordance with the present disclosure. As shown in FIG. 14, example 1400 includes a UE 120 in communication with a base station 110 in a wireless network (e.g., wireless network 100). However, the devices shown in FIG. 15 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 14, the UE 120 receives CSI-RS based L1-RSRP report parameters from the base station 110. The UE 120 may determine that the base station 110 is capable of performing MAC based TCI switching based on receiving the CSI-RS based L1-RSRP report parameters from the base station 110. The UE 120 may deactivate an autonomous beam switching made based at least in part on the base station 110 being capable of performing MAC based TCI switching.

The UE 120 may receive SSBs from the base station 110. The UE 120 may select an SSB, from the SSBs, based at least in part on a measurement configuration, as described elsewhere herein. The UE 120 may switch to the selected SSB as the serving SSB and may provide information associated with switching to the selected SSB to the base station 110.

As indicated above, FIG. 14 is provided as an example. Other examples may differ from what is described with respect to FIG. 14.

FIG. 15 is a diagram illustrating an example process 1500 performed, for example, by a UE, in accordance with the present disclosure. Example process 1500 is an example where the UE (e.g., UE 120) performs operations associated with SSB beam switching.

As shown in FIG. 15, in some aspects, process 1500 may include identifying a base station capable of performing MAC based TCI switching (block 1510). For example, the UE (e.g., using communication manager 140 and/or identification component 1708, depicted in FIG. 17) may identify a base station capable of performing MAC based TCI switching, as described above.

As further shown in FIG. 15, in some aspects, process 1500 may include deactivating an autonomous beam switching mode based at least in part on the base station being capable of performing MAC based TCI switching (block 1520). For example, the UE (e.g., using communication manager 140 and/or deactivation component 1710, depicted in FIG. 17) may deactivate an autonomous beam switching mode based at least in part on the base station being capable of performing MAC based TCI switching, as described above.

Process 1500 may include additional aspects, such as any single aspect or any combination of aspects described below and/or in connection with one or more other processes described elsewhere herein.

In a first aspect, process 1500 includes receiving MAC signaling indicating a synchronization signal block switch, wherein identifying the base station capable of performing MAC based TCI switching is based at least in part on the MAC signaling.

In a second aspect, alone or in combination with the first aspect, identifying the base station capable of performing MAC based TCI switching is based at least in part on receiving configuration information identifying a beam failure parameter.

In a third aspect, alone or in combination with one or more of the first and second aspects, the autonomous beam switching mode is associated with synchronization signal block based beam selection, and wherein identifying the base station capable of performing MAC based TCI switching is based at least in part on receiving configuration information identifying a channel state information reference signal based reporting configuration.

In a fourth aspect, alone or in combination with one or more of the first through third aspects, the autonomous beam switching mode is a mode in which the UE is permitted to select a synchronization signal block that differs from a serving synchronization signal block signaled to the UE by the base station.

In a fifth aspect, alone or in combination with one or more of the first through fourth aspects, identifying the base station capable of performing MAC based TCI switching is based at least in part on a database indicating base stations capable of performing MAC based TCI switching.

In a sixth aspect, alone or in combination with one or more of the first through fifth aspects, the database is based at least in part on geographical information associated with the base station.

In a seventh aspect, alone or in combination with one or more of the first through sixth aspects, the database indicates that the base station is capable of performing MAC based TCI switching based at least in part on another base station being capable of performing MAC based TCI switching, wherein the other base station is associated with the base station based at least in part on the geographical information.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
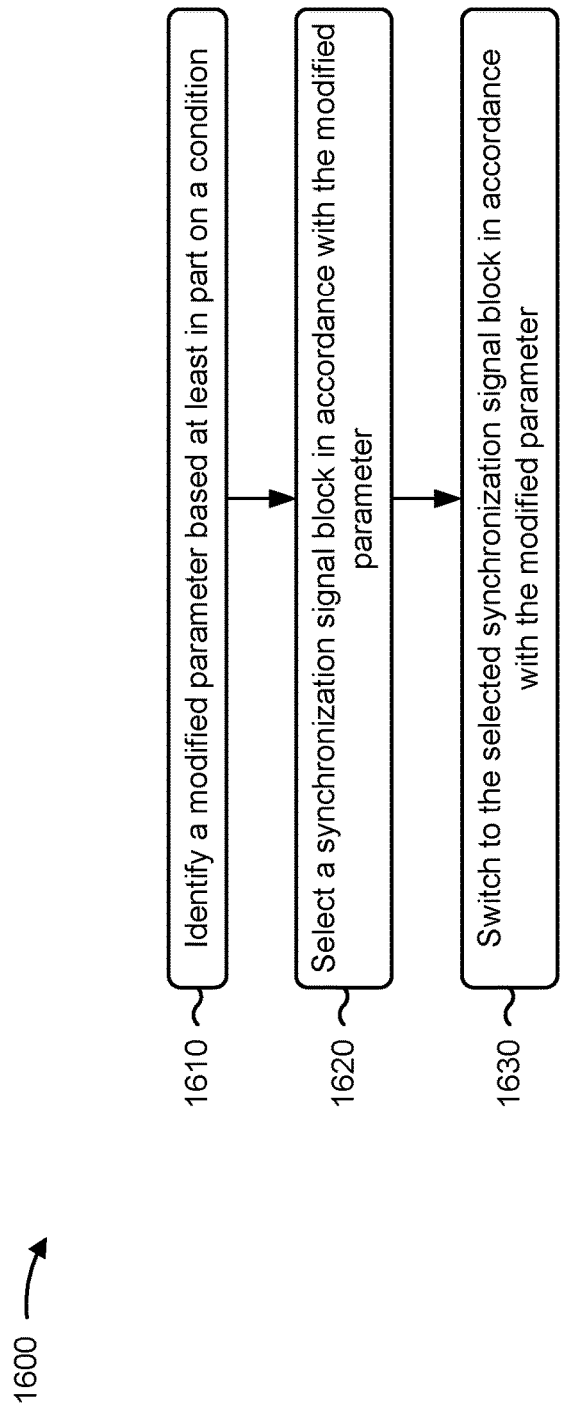

FIG. 16 is a diagram illustrating an example process 1600 performed, for example, by a UE, in accordance with the present disclosure. Example process 1600 is an example where the UE (e.g., UE 120) performs operations associated with SSB beam switching.

As shown in FIG. 16, in some aspects, process 1600 may include identifying a modified parameter based at least in part on a condition (block 1610). For example, the UE (e.g., using communication manager 140 and/or identification component 1808, depicted in FIG. 18) may identify a modified parameter based at least in part on a condition, as described above.

As further shown in FIG. 16, in some aspects, process 1600 may include selecting a synchronization signal block in accordance with the modified parameter (block 1620). For example, the UE (e.g., using communication manager 140 and/or selection component 1810, depicted in FIG. 18) may select a synchronization signal block in accordance with the modified parameter, as described above.

As further shown in FIG. 16, in some aspects, process 1600 may include switching to the selected synchronization signal block in accordance with the modified parameter (block 1630). For example, the UE (e.g., using communication manager 140 and/or switching component 1812, depicted in FIG. 18) may switch to the selected synchronization signal block in accordance with the modified parameter, as described above.

Process 1600 may include additional aspects, such as any single aspect or any combination of aspects described below and/or in connection with one or more other processes described elsewhere herein.

In a first aspect, switching to the selected synchronization signal block further comprises performing MAC based switching to the selected synchronization signal block in accordance with a MAC message, if the MAC message is received within a timer length, or switching to the selected synchronization signal block in the absence of the MAC message if the MAC message is not received within the timer length.

In a second aspect, alone or in combination with the first aspect, the condition is associated with a radio link failure timer being active.

In a third aspect, alone or in combination with one or more of the first and second aspects, the modified parameter is a modified threshold for selecting the synchronization signal block.

In a fourth aspect, alone or in combination with one or more of the first through third aspects, the condition is associated with a measurement satisfying a threshold, and wherein the modified parameter is a modified Layer 1 threshold for selecting the synchronization signal block.

In a fifth aspect, alone or in combination with one or more of the first through fourth aspects, the condition is associated with a channel condition at the UE satisfying a threshold, and wherein the modified parameter is a modified Layer 1 threshold for selecting the synchronization signal block.

In a sixth aspect, alone or in combination with one or more of the first through fifth aspects, process 1600 includes transmitting a Layer 1 reference signal received power (L1-RSRP) report identifying the selected synchronization signal block, wherein the selected synchronization signal block is associated with an L1-RSRP that is stronger than an L1-RSRP associated with a serving synchronization signal block of the UE.

In a seventh aspect, alone or in combination with one or more of the first through sixth aspects, process 1600 includes dynamically adjusting the modified parameter based at least in part on sensing information associated with the condition.

In an eighth aspect, alone or in combination with one or more of the first through seventh aspects, the modified parameter is modified relative to a baseline parameter, and wherein the baseline parameter indicates an offset for a measurement threshold related to selecting the selected synchronization signal block.

In a ninth aspect, alone or in combination with one or more of the first through eighth aspects, selecting the synchronization signal block is based at least in part on a measurement value associated with the selected synchronization signal block satisfying a threshold, and wherein the measurement value is a filtered reference signal received power.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
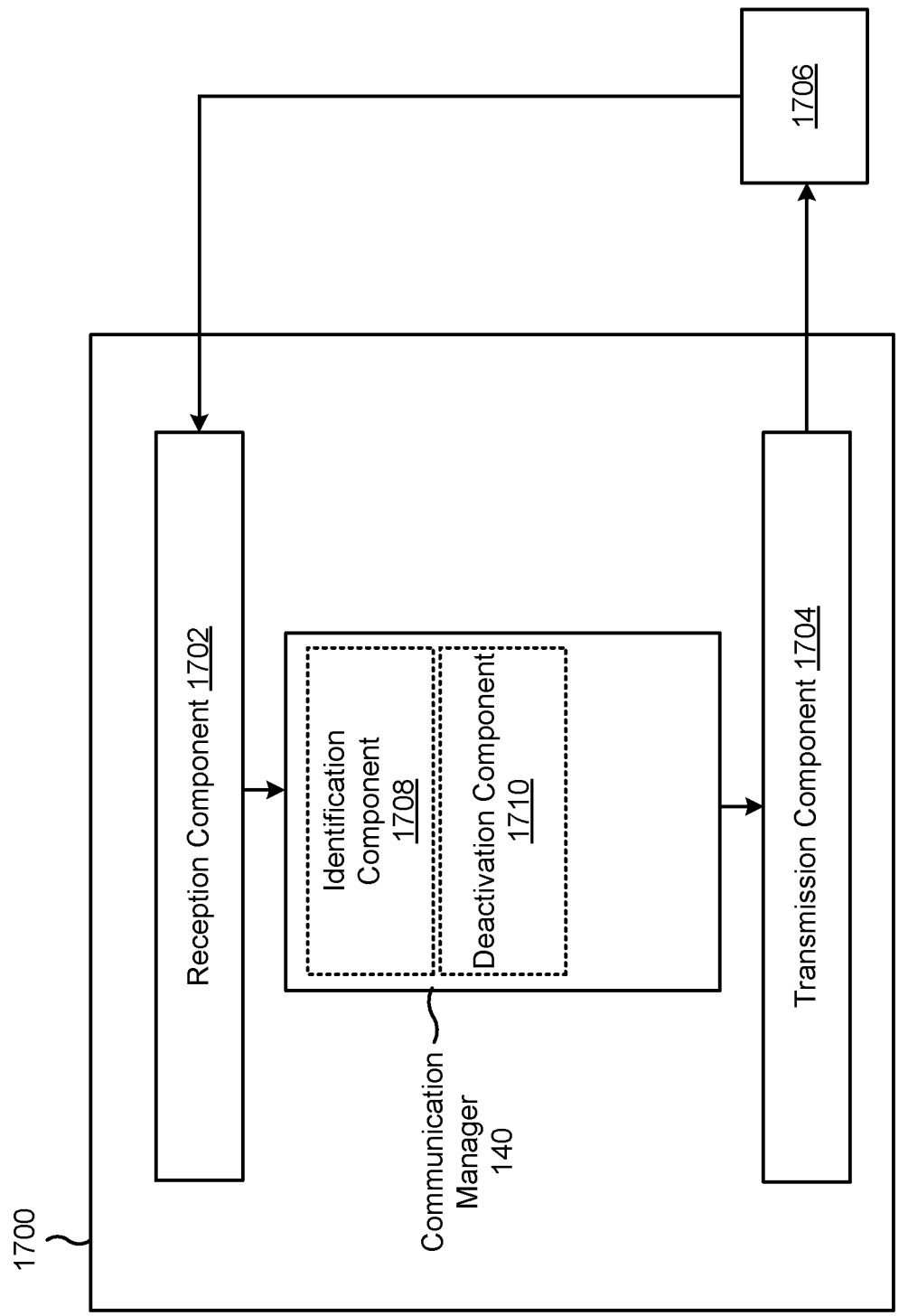
FIGS. 17 and 18 are block diagrams of example apparatuses for wireless communication, in accordance with the present disclosure.

FIG. 17 is a block diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140. The communication manager 140 may include one or more of an identification component 1708 or a deactivation component 1710, among other examples.

In some aspects, the apparatus 1700 may be configured to perform one or more operations described herein in connection with FIGS. 5-14. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The identification component 1708 may identify a base station capable of performing MAC based TCI switching. The deactivation component 1710 may deactivate an autonomous beam switching mode based at least in part on the base station being capable of performing MAC based TCI switching.

The reception component 1702 may receive MAC signaling indicating a synchronization signal block switch, wherein identifying the base station capable of performing MAC based TCI switching is based at least in part on the MAC signaling.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
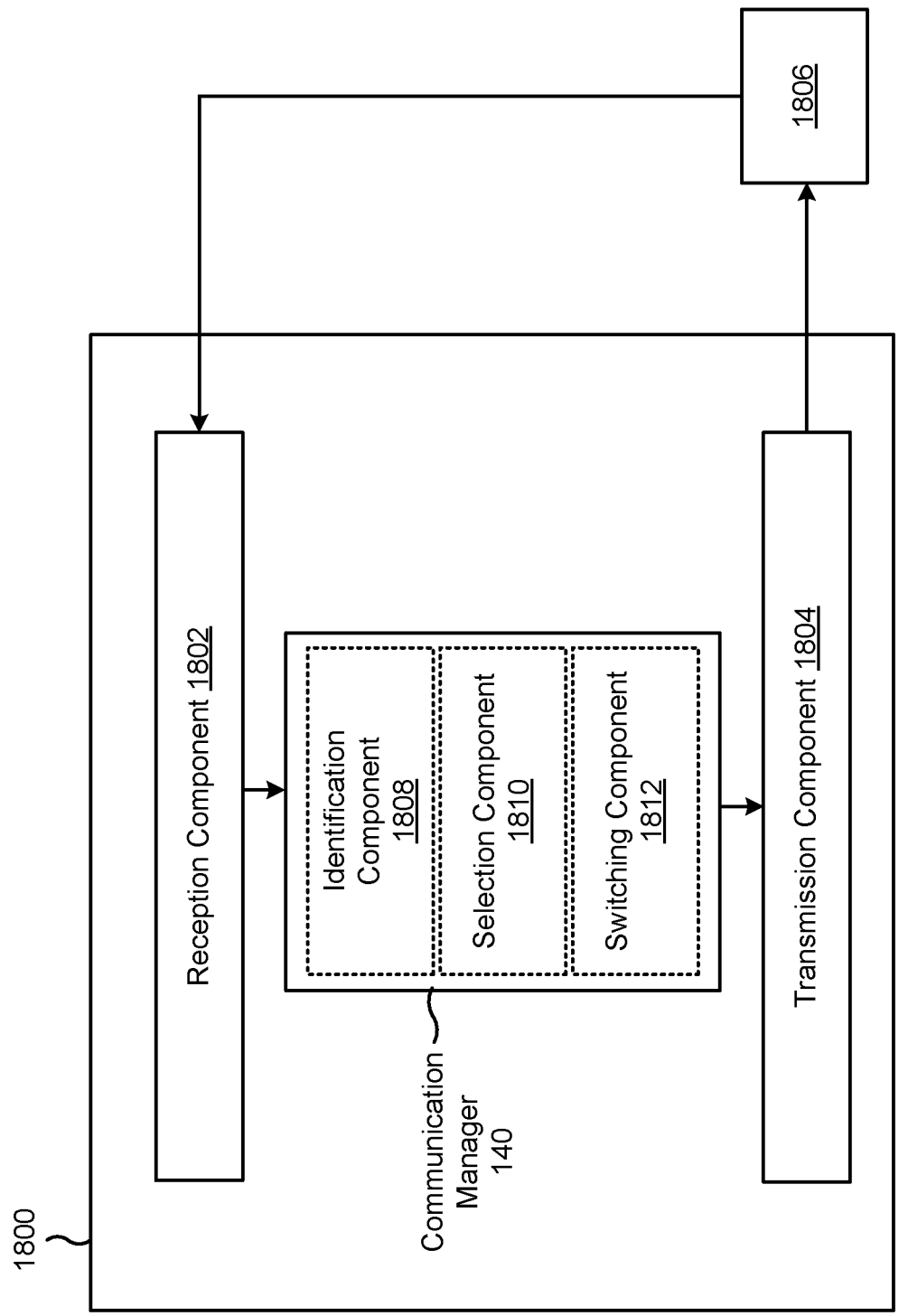

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1100 may include the communication manager 140. The communication manager 140 may include one or more of an identification component 1808, a selection component 1810, or a switching component 1812, among other examples.

In some aspects, the apparatus 1800 may be configured to perform one or more operations described herein in connection with FIGS. 5-15. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be co-located with the reception component 1802 in a transceiver.

The below paragraphs are for the method claim set starting with claim 9.

The identification component 1808 may identify a modified parameter based at least in part on a condition. The selection component 1810 may select a synchronization signal block in accordance with the modified parameter. The switching component 1812 may switch to the selected synchronization signal block in accordance with the modified parameter.

The transmission component 1804 may transmit a Layer 1 reference signal received power (L1-RSRP) report identifying the selected synchronization signal block, wherein the selected synchronization signal block is associated with an L1-RSRP that is stronger than an L1-RSRP associated with a serving synchronization signal block of the UE.

The selection component 1810 may dynamically adjust the modified parameter based at least in part on sensing information associated with the condition.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: identifying a base station capable of performing medium access control (MAC) based transmission configuration indication (TCI) switching; and deactivating an autonomous beam switching mode based at least in part on the base station being capable of performing MAC based TCI switching.

Aspect 2: The method of Aspect 1, further comprising: receiving MAC signaling indicating a synchronization signal block switch, wherein identifying the base station capable of performing MAC based TCI switching is based at least in part on the MAC signaling.

Aspect 3: The method of one or more of Aspects 1 and 2, wherein identifying the base station capable of performing MAC based TCI switching is based at least in part on receiving configuration information identifying a beam failure parameter.

Aspect 4: The method of one or more of Aspects 1 through 3, wherein the autonomous beam switching mode is associated with synchronization signal block based beam selection, and wherein identifying the base station capable of performing MAC based TCI switching is based at least in part on receiving configuration information identifying a channel state information reference signal based reporting configuration.

Aspect 5: The method of one or more of Aspects 1 through 4, wherein the autonomous beam switching mode is a mode in which the UE is permitted to select a synchronization signal block that differs from a serving synchronization signal block signaled to the UE by the base station.

Aspect 6: The method of one or more of Aspects 1 through 5, wherein identifying the base station capable of performing MAC based TCI switching is based at least in part on a data structure indicating base stations capable of performing MAC based TCI switching.

Aspect 7: The method of Aspect 6, wherein the data structure is based at least in part on geographical information associated with the base station.

Aspect 8: The method of Aspect 7, wherein the data structure indicates that the base station is capable of performing MAC based TCI switching based at least in part on another base station being capable of performing MAC based TCI switching, wherein the other base station is associated with the base station based at least in part on the geographical information.

Aspect 9: A method of wireless communication performed by a user equipment (UE), comprising: identifying a modified parameter based at least in part on a condition; selecting a synchronization signal block in accordance with the modified parameter; and switching to the selected synchronization signal block in accordance with the modified parameter.

Aspect 10: The method of Aspect 9, wherein switching to the selected synchronization signal block further comprises: performing medium access control (MAC) based switching to the selected synchronization signal block in accordance with a MAC message, if the MAC message is received within a timer length; or switching to the selected synchronization signal block in the absence of the MAC message if the MAC message is not received within the timer length.

Aspect 11: The method of one or more of Aspects 9 and 10, wherein the condition is associated with a radio link failure timer being active.

Aspect 12: The method of one or more of Aspects 9 through 11, wherein the modified parameter is a modified threshold for selecting the synchronization signal block.

Aspect 13: The method of one or more of Aspects 9 through 12, wherein the condition is associated with a measurement satisfying a threshold, and wherein the modified parameter is a modified Layer 1 threshold for selecting the synchronization signal block.

Aspect 14: The method of one or more of Aspects 9 through 13, wherein the condition is associated with a channel condition at the UE satisfying a threshold, and wherein the modified parameter is a modified Layer 1 threshold for selecting the synchronization signal block.

Aspect 15: The method of one or more of Aspects 9 through 14, further comprising transmitting a Layer 1 reference signal received power (L1-RSRP) report identifying the selected synchronization signal block, wherein the selected synchronization signal block is associated with an L1-RSRP that is stronger than an L1-RSRP associated with a serving synchronization signal block of the UE.

Aspect 16: The method of one or more of Aspects 9 through 15, further comprising: dynamically adjusting the modified parameter based at least in part on sensing information associated with the condition.

Aspect 17: The method of one or more of Aspects 9 through 16, wherein the modified parameter is modified relative to a baseline parameter, and wherein the baseline parameter indicates an offset for a measurement threshold related to selecting the selected synchronization signal block.

Aspect 18: The method of one or more of Aspects 9 through 17, wherein selecting the synchronization signal block is based at least in part on a measurement value associated with the selected synchronization signal block satisfying a threshold, and wherein the measurement value is a filtered reference signal received power.

Aspect 19: An apparatus for wireless communication at a device, comprising a processor; memory coupled with the processor; and instructions stored in the memory and executable by the processor to cause the apparatus to perform the method of one or more of Aspects 1 through 8.

Aspect 20: A device for wireless communication, comprising a memory and one or more processors coupled to the memory, the memory and the one or more processors configured to perform the method of one or more of Aspects 1 through 8.

Aspect 21: An apparatus for wireless communication, comprising at least one means for performing the method of one or more of Aspects 1 through 8.

Aspect 22: A non-transitory computer-readable medium storing code for wireless communication, the code comprising instructions executable by a processor to perform the method of one or more of Aspects 1 through 8.

Aspect 23: A non-transitory computer-readable medium storing a set of instructions for wireless communication, the set of instructions comprising one or more instructions that, when executed by one or more processors of a device, cause the device to perform the method of one or more of Aspects 1 through 8.

Aspect 24: An apparatus for wireless communication at a device, comprising a processor; memory coupled with the processor; and instructions stored in the memory and executable by the processor to cause the apparatus to perform the method of one or more of Aspects 9 through 18.

Aspect 25: A device for wireless communication, comprising a memory and one or more processors coupled to the memory, the memory and the one or more processors configured to perform the method of one or more of Aspects 9 through 18.

Aspect 26: An apparatus for wireless communication, comprising at least one means for performing the method of one or more of Aspects 9 through 18.

Aspect 27: A non-transitory computer-readable medium storing code for wireless communication, the code comprising instructions executable by a processor to perform the method of one or more of Aspects 9 through 18.

Aspect 28: A non-transitory computer-readable medium storing a set of instructions for wireless communication, the set of instructions comprising one or more instructions that, when executed by one or more processors of a device, cause the device to perform the method of one or more of Aspects 9 through 18.

The foregoing disclosure provides illustration and description, but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
identify, based at least in part on a data structure indicating network entities capable of performing medium access control (MAC) based transmission configuration indication (TCI) switching, a network entity capable of performing MAC based TCI switching, wherein the data structure is based at least in part on geographical information associated with the network entity; and
deactivate an autonomous beam switching mode based at least in part on the network entity being capable of performing MAC based TCI switching.

2. The UE of claim 1, wherein the one or more processors are further configured to:
receive MAC signaling indicating a synchronization signal block switch, wherein identifying the network entity capable of performing MAC based TCI switching is based at least in part on the MAC signaling.

3. The UE of claim 1, wherein identifying the network entity capable of performing MAC based TCI switching is based at least in part on receiving configuration information identifying a beam failure parameter.

4. The UE of claim 1, wherein the autonomous beam switching mode is associated with synchronization signal block based beam selection, and wherein identifying the network entity capable of performing MAC based TCI switching is based at least in part on receiving configuration information identifying a channel state information reference signal based reporting configuration.

5. The UE of claim 1, wherein the autonomous beam switching mode is a mode in which the UE is permitted to select a synchronization signal block that differs from a serving synchronization signal block signaled to the UE by the network entity.

6. The UE of claim 1, wherein the data structure indicates that the network entity is capable of performing MAC based TCI switching based at least in part on another network entity being capable of performing MAC based TCI switching, wherein the other network entity is associated with the network entity based at least in part on the geographical information.

7. A UE for wireless communication, comprising:
a memory; and
one or more processors, coupled to the memory, configured to:
identify a modified parameter based at least in part on a condition;
dynamically adjust the modified parameter based at least in part on sensing information associated with the condition;
select a synchronization signal block in accordance with the modified parameter; and
switch to the selected synchronization signal block in accordance with the modified parameter.

8. The UE of claim 7, wherein the one or more processors, to switch to the selected synchronization signal block, are configured to:
perform medium access control (MAC) based switching to the selected synchronization signal block in accordance with a MAC message, if the MAC message is received within a timer length; or
switch to the selected synchronization signal block in the absence of the MAC message if the MAC message is not received within the timer length.

9. The UE of claim 7, wherein the condition is associated with a radio link failure timer being active.

10. The UE of claim 7, wherein the modified parameter is a modified threshold for selecting the synchronization signal block.

11. The UE of claim 7, wherein the condition is associated with a measurement satisfying a threshold, and wherein the modified parameter is a modified Layer 1 threshold for selecting the synchronization signal block.

12. The UE of claim 7, wherein the condition is associated with a channel condition at the UE satisfying a threshold, and wherein the modified parameter is a modified Layer 1 threshold for selecting the synchronization signal block.

13. The UE of claim 7, wherein the one or more processors are further configured to:
transmit a Layer 1 reference signal received power (L1-RSRP) report identifying the selected synchronization signal block, wherein the selected synchronization signal block is associated with an L1-RSRP that is stronger than an L1-RSRP associated with a serving synchronization signal block of the UE.

14. The UE of claim 7, wherein the modified parameter is modified relative to a baseline parameter, and wherein the baseline parameter indicates an offset for a measurement threshold related to selecting the selected synchronization signal block.

15. The UE of claim 7, wherein selecting the synchronization signal block is based at least in part on a measurement value associated with the selected synchronization signal block satisfying a threshold, and wherein the measurement value is a filtered reference signal received power.

16. The UE of claim 7, wherein the one or more processors, to dynamically adjust the modified parameter, are configured to:
increase a value of the modified parameter based at least in part on a throughput gain being limited at a signal-to-noise ratio (SNR).

17. A method of wireless communication performed by a user equipment (UE), comprising:
identifying, based at least in part on a data structure indicating network entities capable of performing medium access control (MAC) based transmission configuration indication (TCI) switching, a network entity capable of performing MAC based TCI switching, wherein the data structure is based at least in part on geographical information associated with the network entity; and
deactivating an autonomous beam switching mode based at least in part on the network entity being capable of performing MAC based TCI switching.

18. The method of claim 17, further comprising:
receiving MAC signaling indicating a synchronization signal block switch, wherein identifying the network entity capable of performing MAC based TCI switching is based at least in part on the MAC signaling.

19. The method of claim 17, wherein identifying the network entity capable of performing MAC based TCI switching is based at least in part on receiving configuration information identifying a beam failure parameter.

20. The method of claim 17, wherein the autonomous beam switching mode is associated with synchronization signal block based beam selection, and wherein identifying the network entity capable of performing MAC based TCI switching is based at least in part on receiving configuration information identifying a channel state information reference signal based reporting configuration.

21. The method of claim 17, wherein the data structure indicates that the network entity is capable of performing MAC based TCI switching based at least in part on another network entity being capable of performing MAC based TCI switching, wherein the other network entity is associated with the network entity based at least in part on the geographical information.

22. A method of wireless communication performed by a user equipment (UE), comprising:
identifying a modified parameter based at least in part on a condition;
dynamically adjusting the modified parameter based at least in part on sensing information associated with the condition;
selecting a synchronization signal block in accordance with the modified parameter; and
switching to the selected synchronization signal block in accordance with the modified parameter.

23. The method of claim 22, wherein switching to the selected synchronization signal block further comprises:
performing medium access control (MAC) based switching to the selected synchronization signal block in accordance with a MAC message, if the MAC message is received within a timer length; or
switching to the selected synchronization signal block in the absence of the MAC message if the MAC message is not received within the timer length.

24. The method of claim 22, wherein the modified parameter is a modified threshold for selecting the synchronization signal block.

25. The method of claim 22, wherein the condition is associated with a measurement satisfying a threshold, and wherein the modified parameter is a modified Layer 1 threshold for selecting the synchronization signal block.

26. The method of claim 22, wherein the condition is associated with a channel condition at the UE satisfying a threshold, and wherein the modified parameter is a modified Layer 1 threshold for selecting the synchronization signal block.

27. The method of claim 22, further comprising:
transmitting a Layer 1 reference signal received power (L1-RSRP) report identifying the selected synchronization signal block, wherein the selected synchronization signal block is associated with an L1-RSRP that is stronger than an L1-RSRP associated with a serving synchronization signal block of the UE.

28. The method of claim 22, wherein selecting the synchronization signal block is based at least in part on a measurement value associated with the selected synchronization signal block satisfying a threshold, and wherein the measurement value is a filtered reference signal received power.

29. The method of claim 22, wherein the condition is associated with a radio link failure timer being active.

30. The method of claim 22, wherein the modified parameter is modified relative to a baseline parameter, and wherein the baseline parameter indicates an offset for a measurement threshold related to selecting the selected synchronization signal block.

\* \* \* \* \*